(12) United States Patent
Casselman et al.

(10) Patent No.: US 10,270,495 B2
(45) Date of Patent: Apr. 23, 2019

(54) SEGMENTED TRANSFERS IN MOBILE NETWORKS USING COORDINATED MULTIPOINT

(71) Applicant: TELEFONAKTIEBOLAGET LM ERICSSON (PUBL)

(72) Inventors: Ronald Casselman, Metcalfe (CA); Gabriel Wainer, Ottawa (CA); Mohammad Moallemi, Gloucester (CA); Misagh Tavanpour, Ottawa (CA); Jan Mikhail, Ottawa (CA); Gary Boudreau, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 30 days.

(21) Appl. No.: 15/125,834

(22) PCT Filed: Feb. 25, 2015

(86) PCT No.: PCT/IB2015/051404
§ 371 (c)(1),
(2) Date: Sep. 13, 2016

(87) PCT Pub. No.: WO2015/145275
PCT Pub. Date: Oct. 1, 2015

(65) Prior Publication Data
US 2017/0005705 A1 Jan. 5, 2017

Related U.S. Application Data

(60) Provisional application No. 61/969,391, filed on Mar. 24, 2014.

(51) Int. Cl.
*H04L 5/00* (2006.01)
*H04B 7/024* (2017.01)
(Continued)

(52) U.S. Cl.
CPC ............ *H04B 7/024* (2013.01); *H04L 5/0032* (2013.01); *H04L 5/0055* (2013.01); *H04L 45/24* (2013.01);
(Continued)

(58) Field of Classification Search
CPC ......... H04L 12/707; H04L 29/12; H04L 5/00; H04W 72/042
See application file for complete search history.

(56) References Cited

U.S. PATENT DOCUMENTS

| | | | | |
|---|---|---|---|---|
| 2012/0176887 | A1* | 7/2012 | Mcbeath | H04L 1/1822 370/216 |
| 2013/0091251 | A1* | 4/2013 | Walker | H04N 21/6125 709/219 |
| 2014/0192734 | A1* | 7/2014 | Ng | H04L 5/0035 370/329 |
| 2015/0249972 | A1* | 9/2015 | You | H04L 5/001 370/254 |

OTHER PUBLICATIONS

Taori, Raesh et al: "Cloud cell: Paving the way for edgeless networks", 2013 IEEE Global Communications Conference (Globecom), IEEE, 9 Dec. 9, 2013.
(Continued)

*Primary Examiner* — Anez C Ebrahim
(74) *Attorney, Agent, or Firm* — Patent Portfolio Builders, PLLC

(57) ABSTRACT

Various methods, devices and nodes in a wireless system are disclosed for efficiently transferring files (both uploads and downloads) between a wireless device and a network node in a Coordinated Multipoint (CoMP) environment. According to a broad aspect, an upload request message is sent from the wireless device to the cooperating nodes in the CoMP set for uploading the data file to the network node, and based on an upload grant from at least one cooperating node, a plurality of piece messages are sent to the cooperating nodes for transmission to the network node, each piece message containing a particular piece of the data file. In yet another broad aspect, both a coordinating node and non-coordinating
(Continued)

nodes in the CoMP set are configured to receive piece messages. Non-coordinating nodes that receive piece messages send acknowledgement messages to the coordinating node indicating which pieces have been received. If at least one piece has not been received at the coordinating node but received at a non-coordinating node, the coordinating node instructs the non-coordinating node to forward the at least one piece received to the network node.

25 Claims, 9 Drawing Sheets

(51) Int. Cl.
 H04L 29/08 (2006.01)
 H04L 12/707 (2013.01)
 H04L 29/12 (2006.01)
(52) U.S. Cl.
 CPC ........ *H04L 61/2007* (2013.01); *H04L 67/108* (2013.01)

(56) References Cited

OTHER PUBLICATIONS

I2R: "Opportunistic coordinated multi-point reception for multi-codeword uplink transmission" 3GPP Draft; R1-112455, Mobile competentce centre, 650, Route des Locioles, F06921 Sophia-Antipolis, Cedex, France.

Johnsen, Jahn Arne: "Peer-to-Peer network with BitTorrent", Dec. 1, 2005, Retreived from the Internet: http://www.cs.ucla.edu/classes/cs217/05bittorrent.pdf [retreived on May 28, 2015].

Erik Dahlmann, Stefan Parkvall, Johan Sköld, Per Beming: "3G Evolution: HSPA and LTE for Mobile Broadband", Academic Press, 2007.

Cohen, Bram. "The BitTorrent protocol specification." (2008): 28.

Manea, Anda, PCT/IB2015/051404, International Search Report, EPO, NL, dated Sep. 6, 2015.

Office action in EP application No. 15712691.3 dated Aug. 1, 2017.

\* cited by examiner

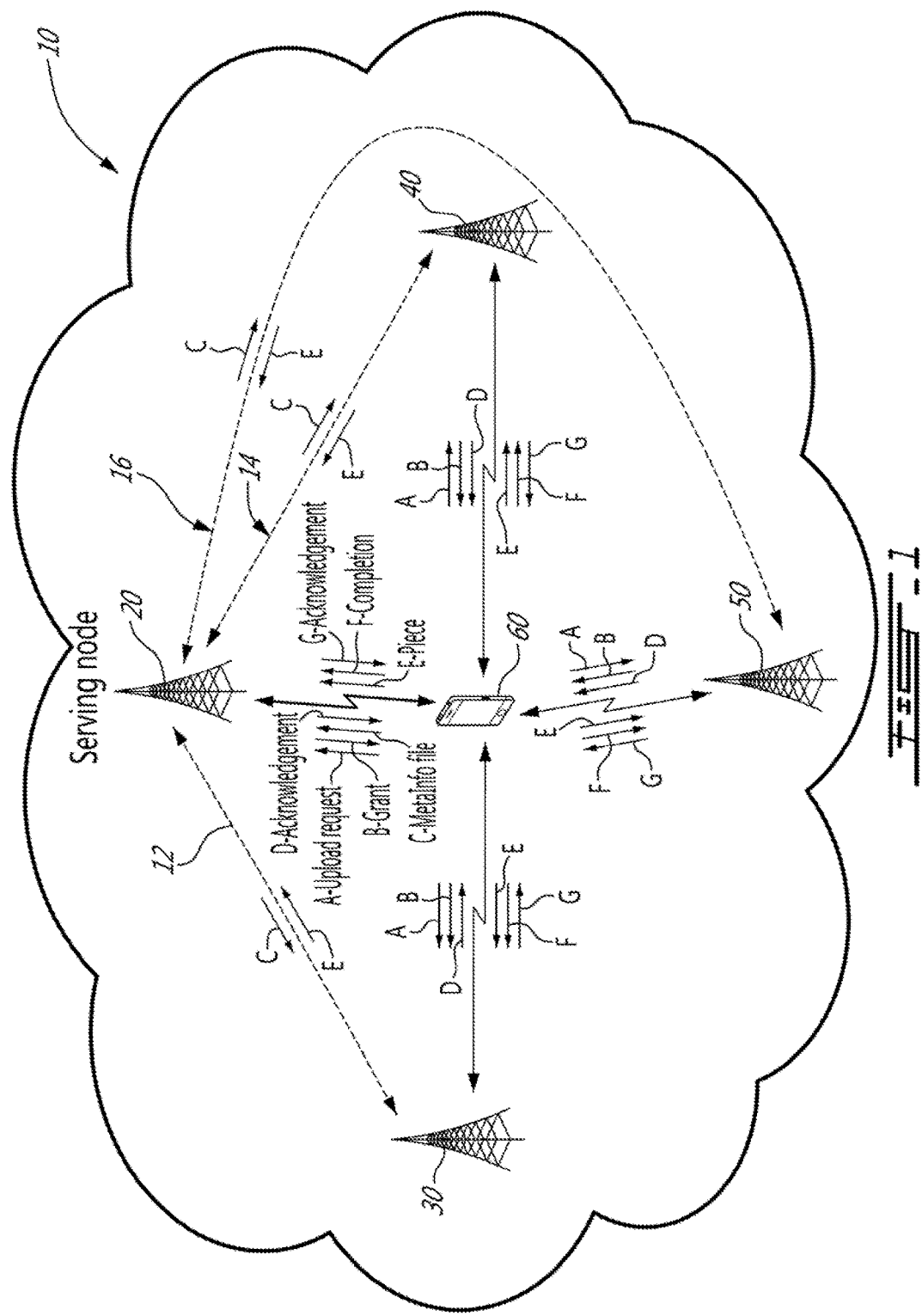

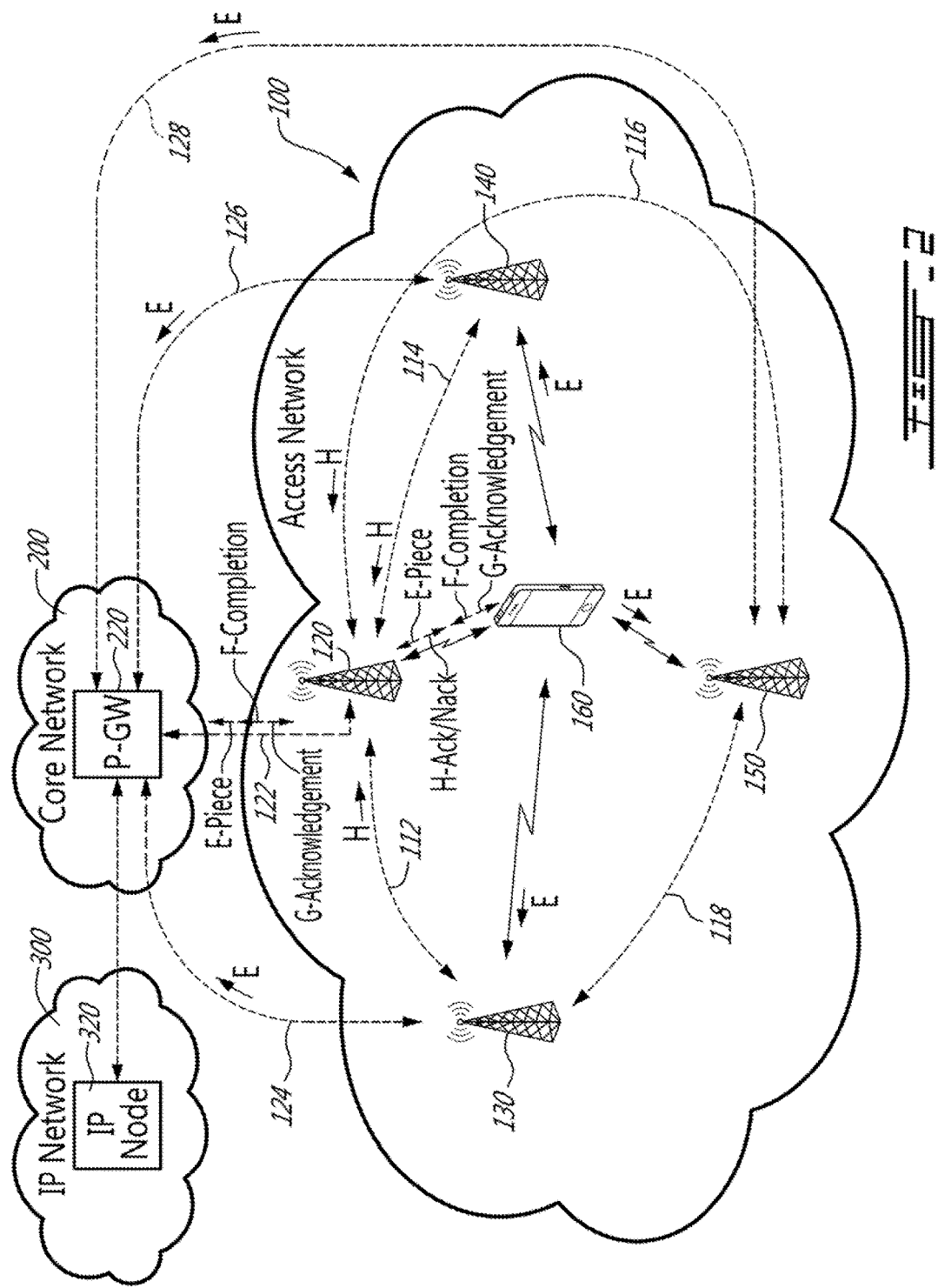

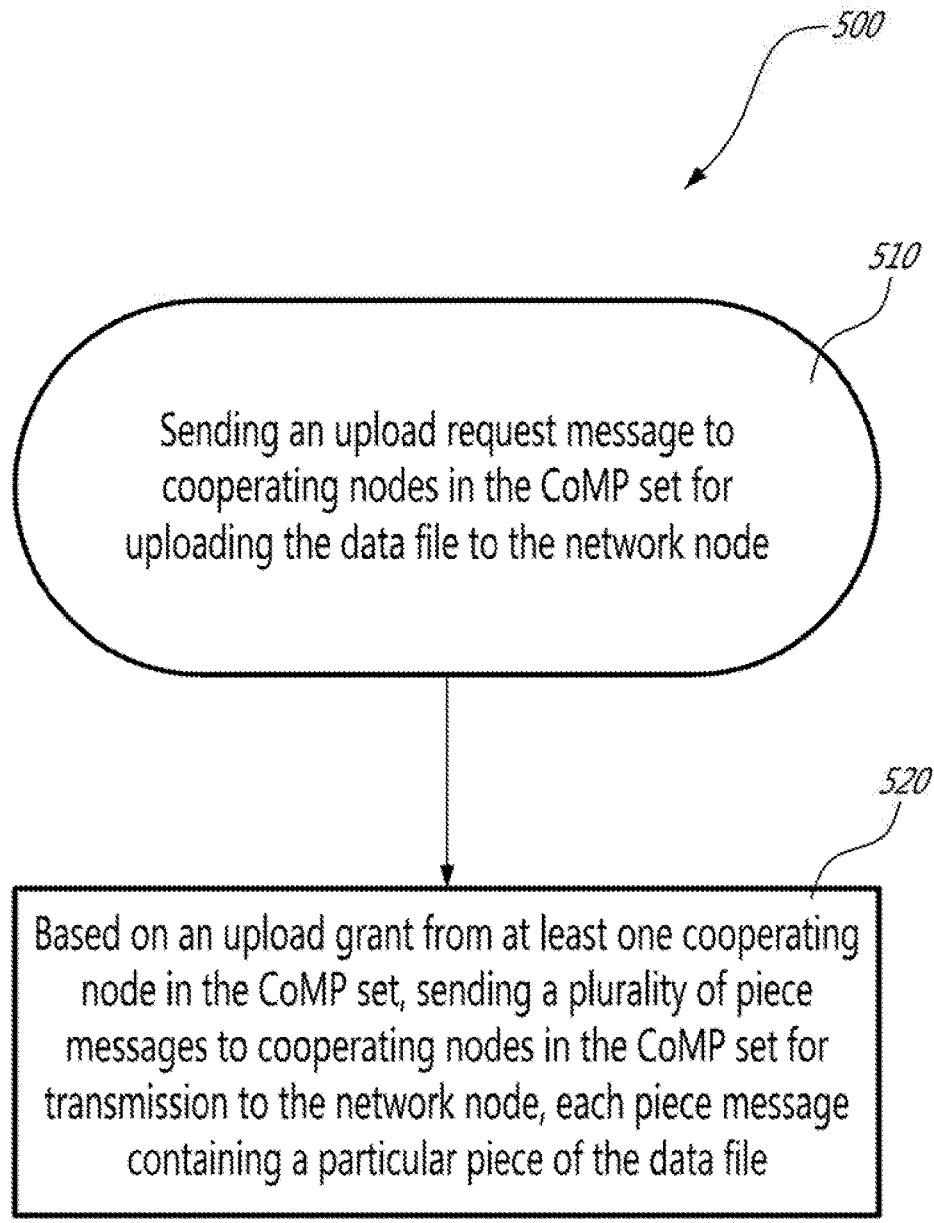

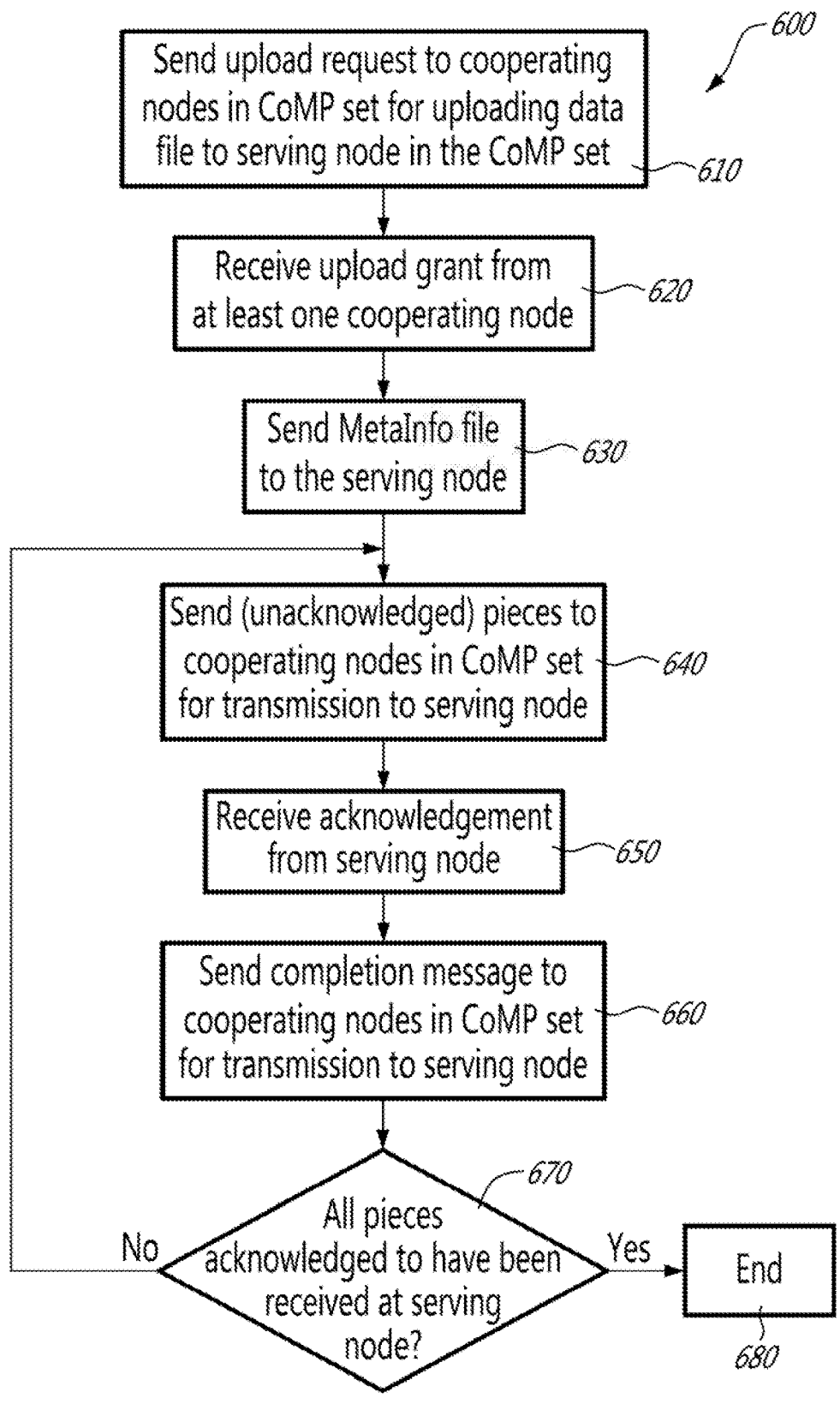

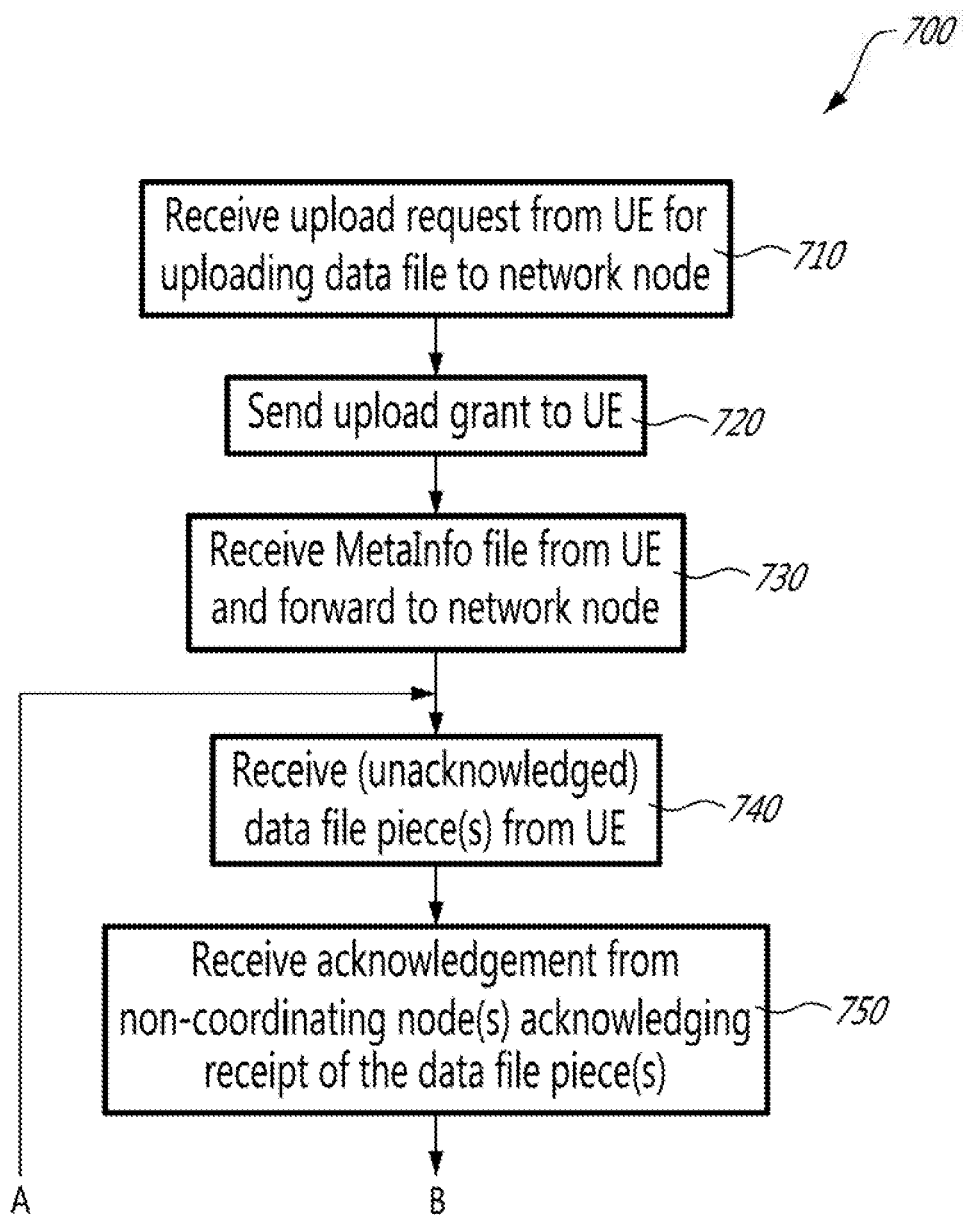

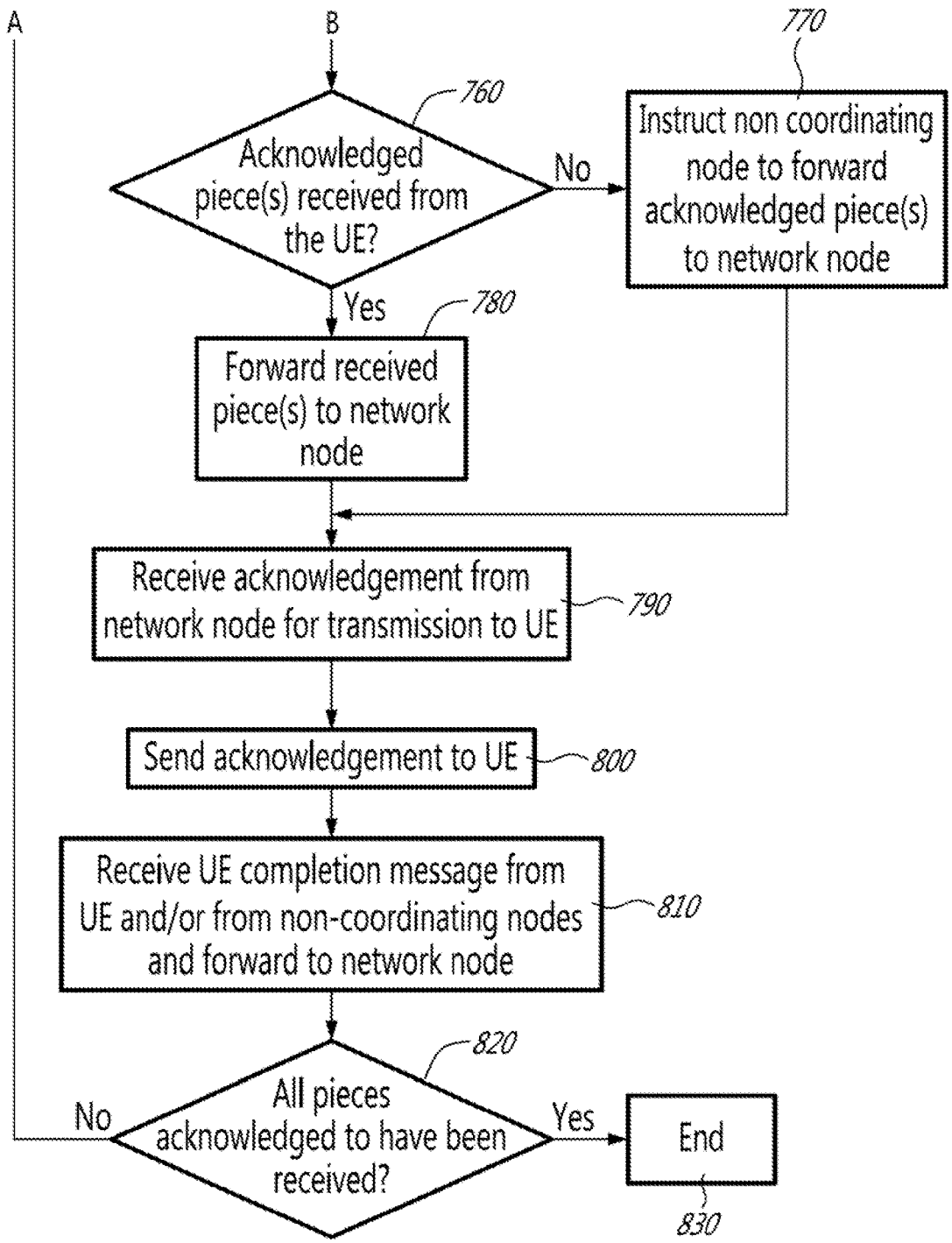

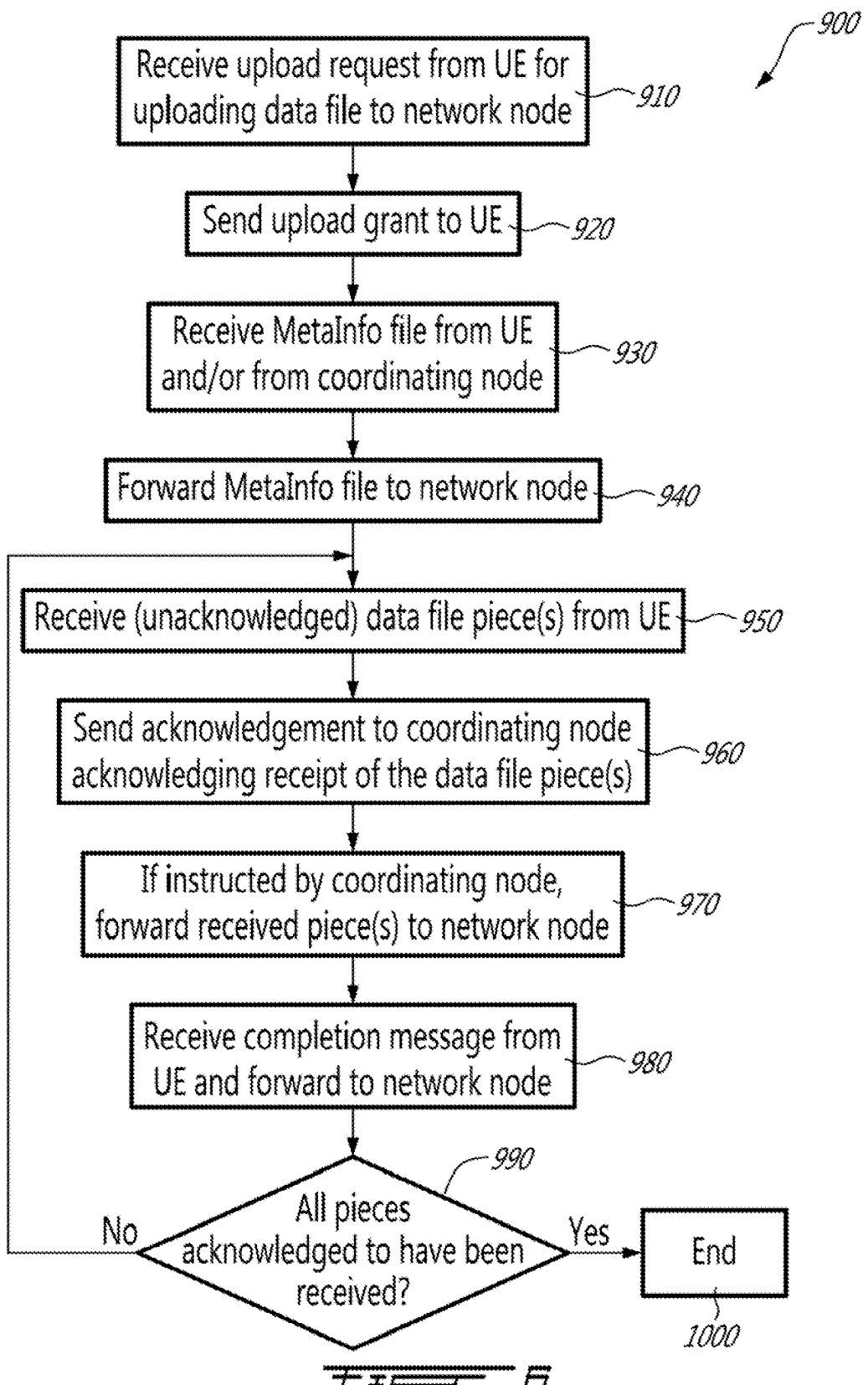

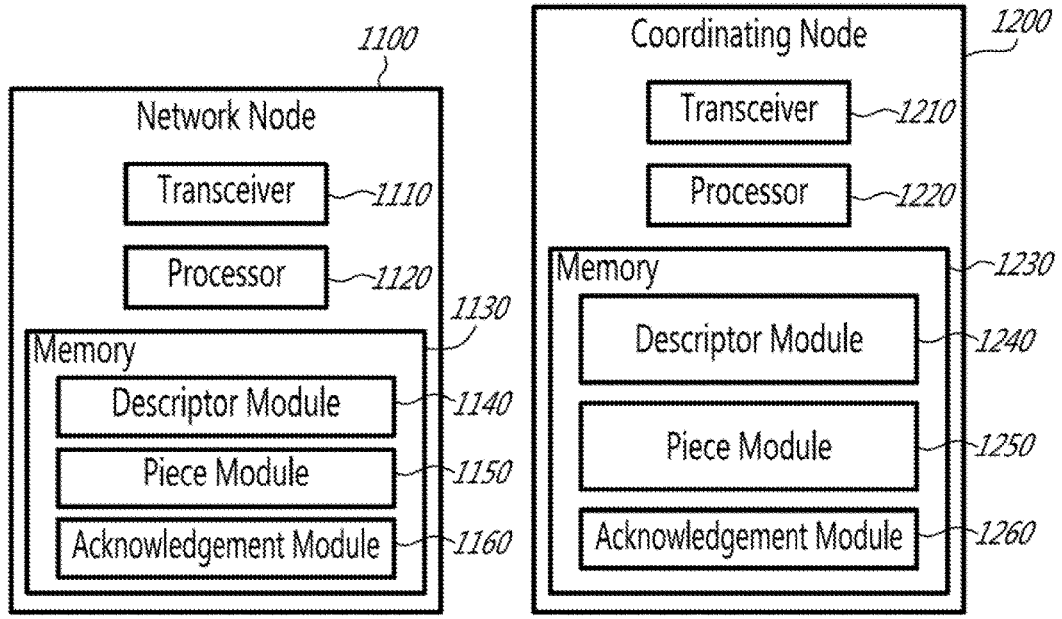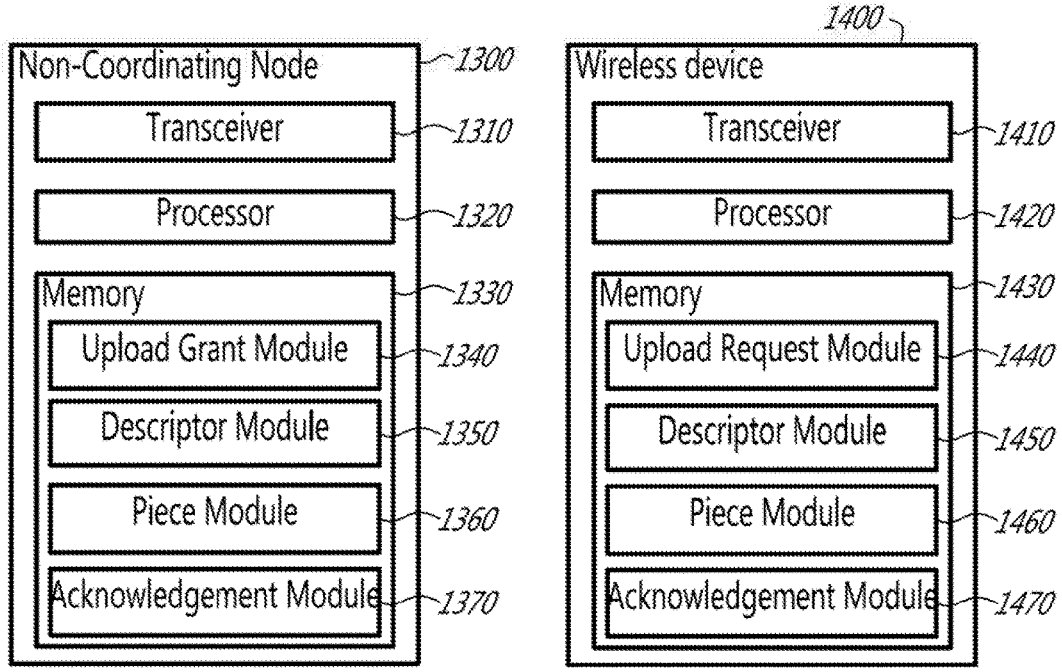

SEGMENTED TRANSFERS IN MOBILE NETWORKS USING COORDINATED MULTIPOINT

RELATED APPLICATIONS

This non-provisional application claims the benefit of U.S. provisional patent application Ser. No. 61/969,391, filed Mar. 24, 2014, the content of which is hereby incorporated by reference in its entirety.

TECHNICAL FIELD

The present disclosure relates to Coordinated Mufti-Point (CoMP) wireless communication systems and in particular to methods and apparatus for efficient data transfers between a wireless device and a network node using CoMP transmission.

BACKGROUND

The evolution of so-called 4G wireless communications networks such as Long Term Evolution (LTE) and LTE-Advanced (LTE-A), is being driving by customer demand for higher capacity and peak throughput. A number of approaches have been developed to meet such demand. However, low data rate cell-edge users continue to pose challenges to meeting these demands. Such users tend to be interference limited. As well, where such users are located indoors, there may be coverage gaps that constrain performance.

Coordinated Multi-Point (CoMP) is a framework of methods to improve both peak user throughput as well as aggregated network throughput in a mobile cellular network. These methods employ multiple access points or base stations (in the LTE environment, known as evolved Node Bs or eNodeBs or eNBs) grouped in a CoMP set of cooperating nodes to communicate with a wireless device (a User Equipment in LTE) of interest. Examples of CoMP methods are disclosed in Dahlmann, Erik et al., "3G Evolution: HSPA and LTE for Mobile Broadband", Academic Press, 2007, which is incorporated by reference in its entirety herein.

CoMP methods may be configured in either a centralized coordinated approach or through a distributed processing architecture to improve capacity. A centralized approach to CoMP where a central node or server coordinates CoMP transmissions between in CoMP set benefits from complete knowledge of the CoMP signals and context. However, such approaches rely on high capacity backhaul interconnects (e.g, via an X2 interface) between the base stations in the CoMP set. Centralized CoMP transmission and reception techniques use multiple transmit and receive antennas from different locations, to send/receive data and to reduce signal interference to the UE. In contrast, distributed processing architectures for CoMP may achieve lower latency and reduced backhaul complexity but may experience reduced performance relative to a centralized CoMP approach.

In LTE-A, CoMP currently includes methods such as Coordinated Scheduling (CS), Coordinated Beamforming (CB), Joint Processing (JP) and Dynamic Point Selection (DPS).

In CS, the resource assignment is coordinated among multiple base stations, and transmitted/received from/to a selected base station. In CB, coordination among base stations or access points is coordinated so that their transmissions are beamformed and directed toward the UE. In downlink (DL) JP, common data is transmitted by multiple base stations and processed jointly by the UE. In uplink (UL) JP, data from the UE is provided to multiple base stations. Two challenges faced in JP, especially UL JP, are the backhaul latency and the backhaul bandwidth called for to transmit data from the receiving base stations to a single process node, which may, in some implementations, be a base station.

Existing CoMP implementations may require extremely high levels of backhaul latency to exchange all of the available data between base stations, especially in JP. For example, during upload of large data files using JP, all of the received UL data will be transferred from one or more CoMP cooperating eNBs to the CoMP serving eNB requiring a high capacity over the X2 interfaces extending between the eNBs. The capacity called for may be on the order of 10s or 100s of Gbps. This can impose a significant cost constraint to the implementation of UL JP. Furthermore, the exchange of large amounts of data over the X2 interfaces between cooperating eNBs may result in significant latency.

SUMMARY

The present disclosure takes advantage of cooperating nodes in a CoMP environment for the efficient transfer (both uploads and downloads) of files (e.g. images, music or video) between a wireless device and a network node.

According to a broad aspect of the disclosure, there is provided a method for a wireless device for uploading a data file as a plurality of pieces to a network node via a coordinated multipoint (CoMP) set of cooperating nodes in a wireless network where the CoMP set includes a coordinating node and at least one non-coordinating node. The method includes sending a upload request message to the cooperating nodes in the CoMP set for uploading the data file to the network node, and based on an upload grant from at least one cooperating node in the CoMP set, sending a plurality of piece messages to the cooperating nodes in the CoMP set for transmission to the network node, each piece message containing a particular piece of the data file.

In this aspect, in some embodiments, the upload request message includes an identifier of the network node. In some other embodiments, the method further includes based on the upload grant from the at least one cooperating node in the CoMP set, sending a descriptor message to the at least one cooperating node in the CoMP set for transmission to the network node. The descriptor message contains an index of the plurality of pieces of the data file. In some other embodiments, the network node is one of the coordinating node in the CoMP set, a core network node in a core network and an Internet Protocol (IP) network node in an IP network. In some other embodiments, the at least one cooperating node includes the coordinating node, and the method further comprises receiving from the coordinating node a grant message indicative of the upload grant.

In yet some other embodiments, the method further includes sending a completion message to the cooperating nodes in the CoMP set for transmission to the network node where the completion message indicates that the plurality of pieces has been sent. In yet some other embodiments, the upload request message and each of the plurality of piece messages are Transport Control Protocol (TCP) messages or alternatively, Multi-Path TCP (MPTCP) messages, each including a TCP subflow identifier.

In yet some other embodiments, the method further includes receiving from the coordinating node in the CoMP set an acknowledgement message indicating whether or not one or more of the plurality of pieces has been received. The acknowledgement message may include a plurality of indicators, each corresponding to one of the plurality of pieces, and each indicator is set based on whether or not the corresponding piece has been received at the network node. Alternatively, the acknowledgement message is one of a physical layer acknowledgement message and a TCP acknowledgement message.

In yet some other embodiments, each piece corresponds to one or more transport blocks and the acknowledgement message includes a set of physical layer acknowledgement messages, each indicating whether or not a particular transport block has been received at a cooperating node in the wireless network. In yet some other embodiments, each transport block corresponds to one or more code words and the acknowledgement message includes a set of physical layer acknowledgement messages, each indicating whether or not a particular code word has been received at a cooperating node in the wireless network. In yet some other embodiments, the physical layer acknowledgement message is one of a positive acknowledgement (ACK) message and a negative acknowledgement (NACK) message. In yet some other embodiments, the method further includes, based on the acknowledgement message received, re-sending one or more piece messages to the cooperating nodes in the CoMP set for transmission to the network node, the one or more piece messages containing the one or more of the plurality of pieces that has not been received.

According to another broad aspect of the disclosure, there is provided a wireless device for uploading a data file as a plurality of pieces to a network node via a coordinated multipoint (CoMP) set of cooperating nodes in a wireless network where the CoMP set includes a coordinating node and at least one non-coordinating node. In that aspect, the wireless device includes circuitry containing instructions which, when executed, cause the wireless device to send an upload request message to the cooperating nodes in the CoMP set for uploading the data file to the network node. Based on an upload grant from at least one cooperating node in the CoMP set, the instructions further cause the wireless device to send a plurality of piece messages to the cooperating nodes in the CoMP set for transmission to the network node where each piece message contains a particular piece of the data file.

In that aspect, in some embodiments, the upload request message includes an identifier of the network node. In some other embodiments, based on the upload grant from the at least one cooperating node in the CoMP set, the instructions further cause the wireless device to send a descriptor message to the at least one cooperating node in the CoMP set for transmission to the network node. The descriptor message contains an index of the plurality of pieces of the data file. In some other embodiments, the network node is one of the coordinating node in the CoMP set, a core network node in a core network and an Internet Protocol (IP) network node in an IP network. In yet some other embodiments, the at least one cooperating node includes the coordinating node, and the instructions further cause the wireless device to receive from the coordinating node a grant message indicative of the upload grant. In yet some other embodiments, the instructions further cause the wireless device to send a completion message to the cooperating nodes in the CoMP set for transmission to the network node. The completion message indicates that the plurality of pieces has been sent. In yet some other embodiments, the upload request message and each of the plurality of piece messages are Transport Control Protocol (TCP) messages or Multi-Path TCP (MPTCP) messages, each including a TCP subflow identifier.

In yet some other embodiments, the instructions further cause the wireless device to receive from the coordinating node in the CoMP set an acknowledgement message indicating whether or not one or more of the plurality of pieces has been received. In yet some embodiments, the acknowledgement message includes a plurality of indicators, each corresponding to one of the plurality of pieces, and each indicator is set based on whether or not the corresponding piece has been received at the network node. In yet some other embodiments, the acknowledgement message is one of a physical layer acknowledgement message and a TCP acknowledgement message. In yet some other embodiments, each piece corresponds to one or more transport blocks and the acknowledgement message includes a set of physical layer acknowledgement messages, each indicating whether or not a particular transport block has been received at a cooperating node in the wireless network. In some other embodiments, each transport block corresponds to one or more code words and the acknowledgement message includes a set of physical layer acknowledgement messages, each indicating whether or not a particular code word has been received at a cooperating node in the wireless network. In yet some other embodiments, the physical layer acknowledgement message is one of a positive acknowledgement (ACK) message and a negative acknowledgement (NACK) message. In yet some other embodiments, based on the acknowledgement message received, the instructions further cause the wireless device to re-send one or more piece messages to the cooperating nodes in the CoMP set for transmission to the network node where the one or more piece messages contain the one or more of the plurality of pieces that has not been received.

In yet another broad aspect of the present disclosure, there is provided a coordinating node for uploading a data file from a wireless device to a network node via a coordinated multipoint (CoMP) set of cooperating nodes in a wireless network where the CoMP set includes the coordinating node and at least one non-coordinating node. In that aspect, the coordinating node includes circuitry containing instructions which, when executed, cause the coordinating node to receive piece messages from the wireless device for transmission to the network node. Each piece message contains a particular piece of the data file. The instructions further cause the coordinating node to receive an acknowledgement message indicating at least one piece has been received at a non-coordinating node, and if the at least one piece has not been received at the coordinating node, to instruct the non-coordinating node to forward the at least one piece to the network node.

In yet another broad aspect of the present disclosure, there is provided a non-coordinating node for uploading a data file as a plurality of pieces from a wireless device to a network node via a coordinated multipoint (CoMP) set of cooperating nodes in a wireless network where the CoMP set includes a coordinating node and at least one non-coordinating node. In that aspect, the non-coordinating node includes circuitry containing instructions which, when executed, cause the coordinating node to receive at least one piece message from the wireless device for transmission to the network node where each of the at least one piece message containing a particular piece of the data file. The instructions further cause the non-coordinating node to send an acknowledgement message to the coordinating node indicating at least one piece has been received at the non-coordinating node and if instructed by the coordinating node, forward the at least one piece received to the network node.

BRIEF DESCRIPTION OF THE DRAWINGS

A more complete understanding of the present disclosure, and the attendant advantages and features thereof, will be more readily understood by reference to the following detailed description when considered in conjunction with the accompanying figures, in which identical reference numbers in different figures indicate identical elements, and in which:

FIG. 1 is an example of a Long Term Evolution (LTE) Radio Access Network (RAN) for uploading a data file from a User Equipment (UE) to a serving node in a Coordinated Multi-Point (CoMP) set of cooperating nodes in accordance with principles of the present disclosure;

FIG. 2 is an example of another LTE RAN in which a UE can upload a data file to a node in an IP network outside of the RAN using a CoMP set of cooperating nodes in accordance with principles of the present disclosure;

FIG. 3 is an example of a method for a UE in a RAN to upload a data file to a destination node using a CoMP set of cooperating nodes in accordance with principles of the present disclosure;

FIG. 4 is another example of a method for a UE in a RAN to upload a data file to a destination node using a CoMP set of cooperating nodes in accordance with principles of the present disclosure;

FIG. 5 is an example of a method for a coordinating node in a CoMP set to receive (or cause to be received at a destination node) a data file upload from a UE in accordance with principles of the present disclosure;

FIG. 6 is an example of a method for a non-coordinating node in a CoMP set for uploading a data file from a UE to a network node in accordance with principles of the present disclosure;

FIGS. 7A-D are block diagrams of exemplary embodiments of a network node, a CoMP coordinating node, a CoMP non-coordinating node and a wireless device configured for the upload of a data file in accordance with the principles of the present disclosure.

DESCRIPTION

Figure 8A:
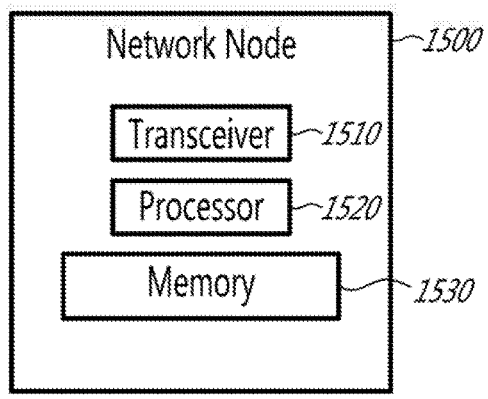
FIGS. 8A-D are block diagrams of other exemplary embodiments of a network node, a CoMP coordinating node, a CoMP non-coordinating node and a wireless device configured for the upload of a data file in accordance with the principles of the present disclosure.

The present disclosure provides methods and related apparatus for efficient data transfers between a wireless device and a node in a network using Coordinated Multi-Point (CoMP) transmissions.

Generally, the present disclosure applies to transfers between a wireless device in a wireless network (also known as a User Equipment or UE in 3GPP) and a node in the same or some other network. The network node may be a Node B (NB), evolved Node B (eNB), base station, wireless access point (AP), base station controller (BSC), radio network controller (RNC), relay, donor node controlling relay, base transceiver station (BTS), transmission point, transmission node, remote RF unit (RRU), remote radio head (RRH), a node in a distributed antenna system (DAS), core network node or a memory management unit (MMU). More generally, the network node may be a serving node of the UE but alternatively may be another node in a Radio Access Network (RAN), a Core Network (CN) or in a network outside of a RAN/CN infrastructure (e.g. an Internet Protocol (IP) node in an IP network) with which the UE may establish or maintain a communication link and/or receive information, in some example embodiments, by a broadcast channel or via some other physical or logical communication channel.

The UE or wireless device may be any type of device capable of at least communicating through wireless communication. The wireless device may be, for example a wireless terminal (also known as a mobile stations, a mobile phone ("cellular" phone), a desktop, laptop, netbook, and/or tablet computer, a laptop embedded equipment (LEE), laptop mounted equipment (LME), or a portable device such as an e-book reader, watch, digital music and/or video player, camera, game controller and/or device but also may be a computing-like device such as a hart monitoring implant, biochip transponder, automobile, sensor, modem, thermostat, and/or other home or car appliance generally referred to as an Internet of Things (IoT) device, a machine type communication (MTC) device (also known as a machine-to-machine (M2M) or device-to-device (D2D) device).

The following description will now be presented in the context of an LTE infrastructure but it is to be understood that it is not limited as such and the concepts presented herein may be applied to other $4^{th}$ Generation (4G), $5^{th}$ Generation (5G) or other future generations of a 3GPP communication network infrastructure. More generally, the present disclosure applies to any current or future wireless network infrastructure adapted to or configured for use with CoMP communications.

Further, although in this description the wireless device and/or network node is described as being configured to use and/or operate with a single carrier (single carrier operation) for LTE communications, the concepts described herein may be applied, with or without modification that will be apparent to a person having ordinary skill in the relevant art, to multi-carrier or carrier aggregation-based communications.

As will be described below in further detail, the present disclosure takes advantage of cooperating nodes in a CoMP environment for efficiently transferring large files (both uploads and downloads) between a wireless device and a network node. For clarity and brevity, the examples detailed below relate primarily to file uploads (from a UE to a network node) but it is understood that the same concepts may be applied to file downloads (from the network node to the UE), with or without modification that will be apparent to those having ordinary skill in this art.

The techniques described herein rely on the transfer of data files as small segments or pieces, an approach based in part on the well-known BitTorrent algorithm. BitTorrent, (disclosed in Cohen, Bram, "The BitTorrent protocol specification" (2008) and incorporated by reference in its entirety herein), is a peer-to-peer file sharing protocol for distributing large amounts of data across the Internet with reduced server and network impact. Instead of downloading a file from a single server, the BitTorrent protocol allows users to join a "swarm" of hosts to download and upload from each other, simultaneously. This permits efficient distribution of files to many recipients using lower bandwidth computers and networks and is an alternative to single source, multiple mirror sources techniques for data distribution. Because of its distributed host approach, BitTorrent also tends to help reduce (or avoid) large local spikes in internet traffic.

In BitTorrent, a user who wants to upload a file, first creates a small torrent descriptor file and makes it available through a BitTorrent node acting as a seed. Other BitTorrent nodes, acting as peers, may connect, directly or indirectly through peers, to the seed and download the descriptor file. The file to be uploaded is divided by the seed (or source) device into equal-sized segments called pieces. Each piece is cryptographically protected to ensure detection of malicious or inadvertent modification using a hash contained in the descriptor. Pieces are downloaded to peers, who then become a source for downloaded piece(s) to other peers. Pieces are conventionally downloaded non-sequentially. A BitTorrent client desiring to access a file downloads the file pieces and rearranges them in the correct order to recreate the file. Once a peer has downloaded all of the pieces, it becomes a seed for that file.

According to principles of the present disclosure, nodes in a CoMP set of cooperating nodes in an access network (e.g. a RAN) serving a mobile device cooperate to efficiently receive and route pieces or segments of a data file to a destination node where the pieces can be re-assembled to recreate the file. The destination node can be in the RAN, in a CN or in another network connected to the RAN/CN.

Advantageously, breaking up a file into smaller pieces before transmission in the RAN may increase the likelihood that portions of the file will be successfully transferred without requiring a retransmission, even if a TCP protocol is used to send the file pieces. Further, the transfer of a data file as pieces in a CoMP setting may reduce the file transfer latency, improve the overall throughput for large file transfers and/or reduce node-to-node connection usage or cost.

Referring now to FIG. 1, there is shown an example of an LTE RAN 10 in which a UE 60 can upload data to a RAN node, in this case a serving node 20 for the UE 60, using a CoMP set of cooperating nodes 20, 30, 40, 50. In the example of FIG. 1, the CoMP set of coordinating nodes 20, 30, 40, 50 includes the serving node 20 which is configured as a coordinating node for the CoMP set. The CoMP set additionally includes three other (non-coordinating) access nodes 30, 40, 50. Efficiencies in throughput and latency derive from the fact that even if the serving node 20 does not directly receive a piece from the UE 60, it may receive it from one of the other cooperating nodes 30, 40, 50 (one with a better connection with the UE 60) in the CoMP set via a node-to-node or backhaul connection (e.g. an X2 interface) 12, 14, 16, thus reducing the likelihood that the UE 60 would need to retransmit the piece.

As is well known, a CoMP serving set may be created for a given UE based on measurement of beacons or reference symbols on either the uplink and/or the downlink. In some example embodiments, this can include RSRP, RSPQ, CSI-RS or DMRS for the downlink and SRS on the uplink. In some example embodiments, nodes are selected as part of the CoMP serving set if the selected beacons or reference symbols exceed a defined threshold. As mentioned above, the non-coordinating nodes 30, 40, 50 are configured to communicate with the coordinating node 20 via a node-to-node interface (e.g. an X2 interface) or backhaul connection 12, 14, 16. In the example of FIG. 1, each node 20, 30, 40, 50 in the CoMP set may be a macro, or high power access node, which in 3GPP LTE is referred to as an evolved Node B (eNB) but could alternatively each be a low power base station (e.g., a micro, pico, femto, or home eNB) or another type of access node depending on the type of access technology used. As will be described below in greater detail, the UE 60 is configured to upload data via the CoMP set of cooperating nodes 20, 30, 40, 50 for use either at the serving node 20 or for transmission to another node in the RAN 10, in a CN or in another network (not shown) to which the RAN 10 might be connected to directly or indirectly.

In the example of FIG. 1, the UE 60 is configured to upload data in pieces or segments to its serving node 20 via the CoMP set of cooperating nodes 20, 30, 40, 50. More specifically, when a data file needs to be uploaded (in this example to the serving node 20), the UE 60 sends the data file as a plurality of pieces as well as an optional descriptor file containing metadata (e.g. an index or dictionary) of the data file pieces. At the serving node 20, the individual pieces are re-assembled using (for example) the metadata or index information contained in the descriptor file to recreate the file sent by the UE 60. It is to be noted that the serving node 20 could use other descriptive information for the file re-assembly (e.g. descriptive information embedded in the individual pieces themselves). For clarity, the term "descriptor file" used herein is intended to cover any type of descriptive or indexing information sent in one or multiple messages that can be used to receive and/or re-assemble individual pieces into a data file. In some embodiments, the descriptor file may also be used by the non-coordinating nodes 30, 40, 50 to determine and acknowledge receipt of individual pieces to the UE 60 and/or to the serving node 20. This will be explained in greater detail below.

Returning to FIG. 1, shown therein are example messages A-F for the upload of a file from the UE 60 to the serving node 20 via the cooperating nodes 20, 30, 40, 50.

In message A, the UE 60 sends an upload request to the cooperating nodes 20, 30, 40, 50 in the CoMP set to request resources (and/or permission) for uploading a data file to a network node, in this case the serving node 20. The upload request message can be sent in many ways. For example, the message may be sent in the form of a unicast transmission from the UE 60 to one or more of the nodes 20, 30, 40, 50 or a broadcast transmission which may include a unicast transmission to the serving or coordinating node 20 that can be received detected by the non-coordinating nodes 30, 40, 50.

In some example embodiments, the upload request message includes one or more of the following parameters:

| Parameter | Description |
| --- | --- |
| Info_hash | 20-byte hash (e.g. a SHA1 hash) of the File Info parameter value from the MetaInfo file (further details below). The Info_hash value may be a Bencoded dictionary of the Info parameter. |
| UE_ID | Unique identifier (ID) of the UE (e.g. the UE 60). |
| Serving_BS_ID | ID of the network node (e.g. serving node 20) that will finally gather the collected file pieces from the cooperating nodes in the CoMP set. |
| Port | TCP port number for the network node (e.g. serving node 20) to receive the data file (e.g. a fixed port number can be assigned). |
| IP | IP address of the UE (e.g. in dotted quad format or RFC 3513 defined hexed IPv6 address). In general, this parameter is optional and not necessary as the address of the UE can be determined from the TCP layer. |

In response to sending an upload request to the cooperating nodes 20, 30, 40, 50, the UE 60 receives a grant message (or some other response or handshake message granting the upload request) from at least one cooperating node 20, 30, 40, 50 which is indicative of an upload or uplink grant for the UE 60 in the CoMP set. The grant message is exemplified as message B in FIG. 1 and is shown to be received from each of the cooperating nodes 20, 30, 40, 50 (as a grant for a given node). In other examples (not shown), only the serving node 20 or only one or more of the non-coordinating nodes 30, 40, 50 send a grant message to the UE 60. In other embodiments, in addition to being indicative of an upload grant, the grant message (e.g. message B) may also be indicative of the ability of each of the cooperating nodes 20, 30, 40, 50 to participate in the CoMP upload session. Other implementations for the meaning and/or means of transmission of the grant message(s) are possible.

In some example embodiments, the grant message is the first message transmitted by the cooperating node(s) 20, 30, 40 during an upload session. In some other example embodiments, the grant message includes one or more of the following parameters:

| Parameter | Description |
| --- | --- |
| Pstr | String identifier of the protocol used between the UE and cooperating nodes in the CoMP set. |
| Reserved | Eight (8) reserved bytes. Each bit in these bytes can be used to change the behavior of the protocol identified by string identifier Pstr. |
| Info_hash | 20-byte hash (e.g. a SHA1 hash) of the File Info parameter value in the Metainfo file (further details below). Same as the Info_hash value transmitted by the UE in the upload request message. |
| BS_id | Unique ID for the cooperating node in the CoMP set sending the grant message. |
| IP | IP address (e.g. IPv6 or IPv4) of the cooperating node in the CoMP set sending the grant message. |
| Port | TCP port number for the cooperating node in the CoMP set sending the grant message |

The examples described above use one upload request and grant message exchange to initiate the upload of a data file but in some implementations, multiple upload request/grant messages may be used. For example, a separate upload request/grant message exchange could be used to upload each piece or a group of pieces.

In message C, the UE 60 sends a descriptor file (in this example, a MetaInfo file) to the cooperating nodes 20, 30, 40, 50. The MetaInfo or descriptor file created by the UE is comparatively smaller than the data file to be uploaded and contains metadata descriptive of the data file pieces to be transferred to the serving node 20. In some example embodiments, the MetaInfo file message includes one or more of the following parameters:

| Parameter | Description |
| --- | --- |
| File Info | Dictionary that describes the data file to be sent to the network node (e.g. the serving node 20) |
| File Length | Length of the data file in bytes (e.g. integer value). |
| File Name | Name of the data file (e.g. string value) |
| Piece Length | Number of bytes in each data file piece (e.g. integer value). |
| Pieces | String consisting of the concatenation of all 20-byte hash (e.g. SHA1) values of file pieces, one per piece (e.g. raw binary encoded). |

In the example shown above, the MetaInfo file message includes a dictionary (referred to above as a "File Info") which is descriptive of the data file to be sent. The dictionary includes a file length field, a file name field, a piece length field and a pieces field. In some example embodiments, the piece length specifies a nominal piece size, which in some example embodiments is a power of 2 and in some other example embodiments, may be 256 kB, 512 kB and 1 MB. In the above example, each piece is referenced by a hash value and all of the hash values are concatenated to form a string included in the pieces field. Therefore, the smaller the piece, the larger the pieces string will be, and as a result, the larger the MetaInfo file will be. In general, there is a tradeoff between the piece length or size and the efficiency of the upload techniques described herein. For example, a large piece size may slow down the upload as it becomes similar to uploading a large data file. Conversely, a small piece size may result in a large MetaInfo file which in turn may increase inefficiency and unnecessary upload overhead. The optimal piece size may depend on various factors, such as for example, the number of cooperating nodes 20, 30, 40, 50 in the CoMP set, the number of handovers that may occur during the file transfer, the general quality or condition of the uplink, whether the UE is relatively stationary or in motion, etc. As a result, the piece size may be selected based on the file size but could also be based on additional and/or different factors such as those described above. In some example embodiments, the piece size is chosen to be the smallest piece size that results in a metadata file that does not substantially exceed 50-75 kB. It is to be noted however that since the file may not be an exact multiple of the piece size, the final piece may be smaller than the piece size.

In some example embodiments, the MetaInfo file includes a hash of the data contained within each piece and each hash is of a fixed size. In some example embodiments, the hash is a cryptographic or secure hash (such as a SHA1 hash) and is 20 bytes in length. The hashes are concatenated (following the piece order) to form the pieces value in the MetaInfo file.

According to principles of the present disclosure, there are many ways in which the MetaInfo file may be sent to the cooperating nodes 20, 30, 40, 50. For example, the UE 60 may send the MetaInfo file message to the serving node 20 which can in turn forwards it to the other nodes 30, 40, 50 in the CoMP set (using a similar message containing the MetaInfo file via, for example, an X2 interface). This is shown in FIG. 1 as message C. In other examples, some or all of the non-coordinating nodes 30, 40, 50 in the CoMP set are configured to detect the MetaInfo file transmitted form the UE 60 to the serving node 20, in which case, the serving node 20 does not have to forward the MetaInfo file received (as shown in FIG. 1) to other nodes 30, 40, 50 in the CoMP set, Other possibilities may exist. Thereafter, the nodes and the UE may communicate through the exchange of length-prefixed messages.

Optionally, some or all of the nodes 20, 30, 40, 50 in the CoMP set acknowledge receipt of the MetaInfo file by sending an acknowledgement message D to the UE 60. In some embodiments, only the serving node 20 sends acknowledgment message D to acknowledge receipt of the MetaInfo file after the grant message has been received and before any other message is sent. In other embodiments, each of the nodes 20, 30, 40, 50 sends the acknowledgment. In addition to or instead of acknowledging the MetaInfo file, a node 20, 30, 40, 50 may in some embodiments use the acknowledgement message D to indicate to the UE 60 or other nodes 20, 30, 40, 50 in the CoMP set which pieces are available or have been correctly received either at the node 20, 30, 40, 50 or at the destination node (e.g. the serving node 20). In some example embodiments, the acknowledgement message D is a length-prefixed message and includes one or more of the following parameters:

<len=0001+X><id=0><bitfield>

In this example, the acknowledgement message D is of variable length and is prefixed with parameter "len" representing the length of the message (e.g. in a number of bytes) with X indicative of the (variable) length of a "bitfield" parameter. The acknowledgement message D includes an "id" parameter that identifies the message type (e.g. in this case an acknowledgement message) as well as the "bitfield" parameter which represents the pieces, in sequence and whether they have been successfully uploaded or not (either at a particular node 20, 30, 40, 50 or at the destination node (in this case the serving node 20). In some example embodiments, the bitfield includes a plurality of indicators, each corresponding to one of the pieces where each indicator is set based on whether or not the corresponding piece has been received successfully. In some other example embodiments, the bitfield includes a plurality of bits that collectively represent the pieces in sequence (or an index of the pieces) with, for example, the Most Significant Bit (MSB) in the first byte corresponding to a piece having an index of 0, the second MSB corresponding to a piece having an index of 1 and so on. In some example embodiments, bits in the "bitfield" are cleared to indicate a missing piece and bits are set to indicate receipt of a valid and available piece. In some example embodiments, spare bits at the end of the bit field are set to 0. Other indicators to represent available or missing pieces can be used.

FIG. 1 shows the nodes 20, 30, 40, 50 using an acknowledgement message (message D) to acknowledge the MetaInfo file. However, it is assumed that the UE 60 has not yet started to send any piece yet by the time the acknowledgement message (message D) is received. If the acknowledgement message is also used to acknowledge missing or correctly received pieces, the bitfield parameter will show that no piece has been received at that point in the process. As will be explained below, if an acknowledgement message D is received after the UE 60 has begun to send pieces to the cooperating nodes 20, 30, 40, 50 in the CoMP set, the bitfield will reflect the availability of pieces at either the nodes 20, 30, 40, 50 or the destination node which, in the example of FIG. 1, is the serving node 20.

Once the optional MetaInfo file has been successfully transmitted, the UE 60 commences the transmission of file pieces (not necessarily in sequence order) by sending one or more piece messages E. Although the piece messages E are shown transmitted to each node 20, 30, 40, 50 it is important to note that the present disclosure is not limited as such. In one implementation, the UE 60 is configured to send the piece messages E to at least the serving node 20 (as the destination node for the data file) and optionally the non-coordinating nodes 30, 40, 50 in the CoMP set are configured to detect the piece message(s) E transmitted from the UE 60. In another example, the piece messages E may be broadcast in the CoMP set to all of the cooperating nodes 20, 30, 40, 50 or may be separately sent to each node 20, 30, 40, 50. Other unicast, multicast or broadcast possibilities may exist for the transmission of the piece messages E from the UE 60 to the nodes 20, 30, 40, 50.

In some example embodiments, the piece message E may include one or more of the following parameters:

<len=0009+X><id=1><index><begin><piece>

In this example, the format of the piece message E is of variable length and is prefixed with a parameter "len" representing the length of the message (e.g. a number of bytes) with X indicative of the (variable) length of a piece contained in the "piece" parameter. The message E also includes an "id" parameter that identifies the message type (e.g. in this case a piece message) as well as the "piece" parameter or field that contains an actual file piece. The message E further includes an "index" parameter which is an integer specifying a (zero-based) index for the piece as referenced in the "bitfield" parameter of the acknowledgement message. The piece message E further includes a "begin" parameter which is an integer specifying a zero-based byte offset within the piece and the piece field which contains a piece of the file, as referenced by the "index" parameter.

In some embodiments, the piece message E is of variable length and contains the actual data that is transferred from the UE 60 to the nodes 20, 30, 40, 50 in the CoMP set. In some example embodiments, the piece message E is a Transport Control Protocol (TCP) message sent at a TCP layer which can advantageously handle piece acknowledgements. When piece messages E are sent as TCP messages, only the destination node (e.g. the serving node 20) needs to acknowledge receipt back to the UE 60. This frees up the cooperating nodes 30, 40, 50 from having to acknowledge pieces. However, as will be described below in further detail, other possibilities exist for acknowledging pieces and/or piece data.

In the example of FIG. 1, pieces received at each non-coordinating node 30, 40, 50 in the CoMP set are sent to the serving node 20 set using the piece message E via (for example) X2 interface 12, 14, 16. In some example embodiments, the serving node 20 determines which piece(s) it did not receive correctly and requests these pieces from another node 30, 40, 50 where the missing pieces have been received successfully. In some other embodiments, the serving node 20 makes that determination based on acknowledgement messages received from the other nodes 30, 40, 50 in the CoMP set (further details below).

More generally, in some implementations, it may be desirable for each node 20, 30, 40, 50 to have all of the pieces received in the CoMP set by at least one other node 20, 30, 40, 50. In that scenario, each node 20, 30, 40, 50 sends its received piece(s) to other nodes 20, 30, 40, 50 in the CoMP set which did not receive the piece(s) successfully. Further, in some embodiments, the nodes 20, 30, 40, 50 exchange acknowledgement messages (e.g. message D) and each node 20, 30, 40, 50 determines which, if any, received pieces are to be sent to other nodes 20, 30, 40, 50 based in part of acknowledgement messages received from other nodes 20, 30, 40, 50.

Once the UE 60 has sent all of the pieces, it sends a completion message F to the nodes 20, 30, 40, 50 to indicate that all of the pieces of the file have been sent. In some example embodiments, the completion message F includes one or more of the following parameters:

<len=0002><id=2><empty>

In this example, the format of the completion message F is of fixed length and has an empty payload (indicated by an "empty" field). The message F is prefixed with a parameter "len" representing the length of the message (e.g. a number of bytes) indicative of the (fixed) length of the message. The message F also includes an "id" parameter that identifies the message type (e.g. in this case a completion message).

In the example of FIG. 1, the completion message F is shown transmitted to each node 20, 30, 40, 50 but the present disclosure is not limited as such. In one example, the UE 60 is configured to send the completion message F to at least the serving node 20 (as the destination node for the data file) and optionally the non-coordinating nodes 30, 40, 50 in the CoMP set are configured to detect the completion message F transmitted from the UE 60. In another example, the completion message may be broadcast in the CoMP set to all of the cooperating nodes 20, 30, 40, 50 or may be separately sent to each node 20, 30, 40, 50. Other unicast, multicast or broadcast possibilities may exist for the transmission of the completion message F.

Upon receipt of all of the pieces, the serving node 20 sends an acknowledgement message G to the UE 60 to acknowledge the pieces received successfully. In some embodiments, the acknowledgement message G has the same format as acknowledgement message D (described above in relation to FIG. 1). If the UE 60 does not receive any acknowledgement message G after completing the transmission of all of the pieces or receives an acknowledgement message G that does not acknowledge receipt of all of the pieces sent (e.g. with bits in the bitfield parameter set to 0), the UE 60 continues to send the missing or unacknowledged pieces based on, for example, the acknowledgement message received G, until all of the unacknowledged pieces have been re-sent. At that point, the UE 60 sends another completion message F (not shown) to indicate that all of the (unacknowledged) pieces have been (re-)sent.

According to principles of the present disclosure, the messages described above can be transmitted at a common layer or at different layers. In some implementations, some or all of the messages described above are Transport Control Protocol (TCP) messages. In one example, at least the upload request message and the piece messages are TCP messages. As is well known, TCP is a transport layer communications protocol that is employed as part of the Internet Protocol (IP). TCP provides reliable, ordered, error-checked delivery of octets/packets between computers or processors (or programs/applications running thereon) in one or more networks. TCP increases the size of packets during reliable transmission but reduces the packet size, often sharply, where congestion or errors are detected. TCP is a single path protocol. Thus, if the selected TCP path fails, the session ends and connection is re-established.

In another example, at least the upload request message A and the piece messages E are Multi-Path TCP (MPTCP) messages. MPTCP is an extension to TCP that enables simultaneous use of several IP addresses within what appears to be a TCP interface. The MPTCP protocol transparently spreads the apparent connection's data across a plurality of sub-flows, each called a TCP connection. The MPTCP protocol is configured to aggregate the set of subflows where each network interface has a separate IP address, and each subflow has separate congestion control. The messages sent at the MPTCP layer (e.g. the upload and/or piece messages) include a TCP subflow identifier and corresponding TCP port for each subflow being employed and supported by a node 20, 30, 40, 50, if more than one subflow is supported by such node 20, 30, 40, 50.

Advantageously, employing MPTCP messages as described above may, in some embodiments, facilitate a distributed load on available interfaces, increase the available network capacity and/or bandwidth, and accommodate handover/failover from one interface to another.

According to principles of the present disclosure, the UE 60 can upload files to different nodes in the RAN 10 or in networks connected directly or indirectly to the RAN 10. Referring now to FIG. 2, there is shown another example of an LTE Radio Access Network 100 in which a UE 160 can upload a data file to a node in an IP network outside of the RAN 100. In this example, the destination node is an IP node 320. In this example, the IP node 320 is connected to the RAN 100 via a gateway node 220 (e.g. a Packet Data Network (PDN) Gateway or P-GW) in a Core Network 200 (e.g. an EPC network).

Similarly to the example shown in FIG. 1, the RAN 100 includes a CoMP set of cooperating nodes 120, 130, 140, 150 that includes the UE's serving node 120 as a coordinating node for the CoMP set as well as three other (non-coordinating) access nodes 130, 140, 150. The nodes 120, 130, 140, 150 are configured to communicate with one another via node-to-node interfaces (e.g. an X2 interface) or backhaul connections 112, 114, 116, 118 as well as with the IP node 320 via the P-GW 220 with respective S1/S5 interface connections 122, 124, 126, 128. In the example of FIG. 2, each cooperating node 120, 130, 140, 150 may be a macro, or high power access node (e.g. eNB) but could alternatively each be a low power base station (e.g., a micro, pico, femto, or home eNB).

The UE 160 is configured to send or upload files in pieces to the CoMP set of coordinating nodes 120, 130, 140, 150 for transmission to the IP node 320 in the IP network 300. More specifically, when a data file needs to be uploaded (in this example to the IP node 320), the UE 160 sends the data file as a plurality of pieces to the CoMP coordinating nodes 120, 130, 140, 150 for transmission to the IP node 320. Optionally, the UE 160 also sends a descriptor file containing metadata (e.g. an index or dictionary) of the data file pieces for transmission to the IP node 320. At the IP node 320, the individual pieces are re-assembled based on the metadata or index information contained in the descriptor file to recreate the file sent by the UE 160. In this example, the process for requesting and obtaining an upload grant as well as transmitting the descriptor file to the cooperating nodes 120, 130, 140, 150 and/or the IP node 320 (e.g. using messages A-C) is similar to that shown in FIG. 1 and, as such, will not be described.

Similarly to the example shown in FIG. 1, some or all of the messages described in relation to FIG. 2 can be transmitted at a common layer (e.g. TCP) or at different layers (e.g. TCP and physical layer). In another embodiment, at least the upload request message A and the piece messages E are Multi-Path TCP (MPTCP) messages and each include a TCP subflow identifier and corresponding TCP port for each subflow being employed and supported by a node 120, 130, 140, 150, if more than one subflow is supported by such node 120, 130, 140, 150.

According to principles of the present disclosure, acknowledgement messages in the example of FIG. 2 are used to control how the pieces received by the cooperating nodes 120, 130, 140, 150 are transmitted to the IP node 320. In some embodiments, when instructed to do so by the coordinating node 120, the (non-coordinating) cooperating nodes 130, 140, 150 are configured to send pieces received from the UE 60 directly to the IP node 320 without having to transit via the coordinating node 120. In particular, when the coordinating node 120 (e.g. the UE's serving node) does not receive certain pieces correctly from the UE 160 but receives an acknowledgement that the (missing) pieces were received successfully at another cooperating node 130, 140, 150, the coordinating node 120 is configured to direct the other cooperating node 130, 140, 150 to send the piece(s) received directly to the IP node 320. Advantageously, by directing cooperating nodes 130, 140, 150 in the CoMP set to send pieces directly to the destination node (via an interface that does not involve the coordinating node 120), the present disclosure may help further reduce the file transfer latency, improve the overall throughput and/or reduce cooperating node-to-node connection usage or cost.

In the example of FIG. 2, the UE 160 commences the transmission of file pieces (not necessarily in sequence order) by sending one or more piece messages E to the nodes 120, 130, 140, 150. If successfully received and as directed by the coordinating node 120 (further details below), the piece messages E are then sent from each node 120, 130, 140, 150 to the destination IP node 320 via a respective interface (e.g. S1/S5) connection 122, 124, 126, 128 to the P-GW 220. Although the piece messages E are shown transmitted to each node 120, 130, 140, 150, it is important to note that the present disclosure is not limited as such. In one implementation, the UE 160 is configured to send the piece messages E to at least the serving node 120 and optionally the non-coordinating nodes 30, 40, 50 in the CoMP set are configured to detect the piece message(s) E transmitted from the UE 160. In another example, the piece messages E may be broadcast in the CoMP set to all of the cooperating nodes 120, 130, 140, 150 or may be sent to each node 120, 130, 140, 150 in separate unicast transmissions. Other unicast, multicast or broadcast possibilities may exist for the transmission of the piece messages E from the UE 160 to the nodes 120, 130, 140, 150. In some embodiments, the piece message E has a format similar to the format described in relation to FIG. 1 and may be in some example embodiments a Transport Control Protocol (TCP) message sent at a TCP layer. When piece messages E are sent as TCP messages, the destination node (e.g. the IP node 320) acknowledges receipt back to the UE 160, which, depending on the implementation, may free up the cooperating nodes 130, 140, 150 from having to acknowledge pieces separately. However, as will be described below in further detail, other possibilities exist for acknowledging pieces and/or piece data.

Once the UE 160 has sent all of the pieces, it sends a completion message F to the cooperating nodes 120, 130, 140, 150 for transmission to the IP node 320 to indicate that all of the pieces of the file have been sent. In some example embodiments, the completion message F has a format similar to that of the completion message F described above in relation to FIG. 1. The completion message F is shown in FIG. 2 as being transmitted only to the coordinating node 120 but in another example (not shown), the non-coordinating nodes 130, 140, 150 in the CoMP set are also configured to detect the completion message F for transmission to the IP node 320 either via the coordinating node 120 or directly via an S1/S5 interface 122, 124, 126, 128. In another example, the completion message may be broadcast in the CoMP set to all of the cooperating nodes 120, 130, 140, 150 or may be separately sent to each node 120, 130, 140, 150. Other unicast, multicast or broadcast possibilities may exist for the transmission of the completion message F.

Upon receiving a completion message F indicating the UE 160 has completed the transmission of all of the pieces, an acknowledgement message G received from the IP node 320 is sent (or forwarded) to the UE 160 indicating whether or not each of the pieces was received successfully. In the example of FIG. 2, only the coordinating node 120 sends the acknowledgement message G to the UE 160. In some embodiments, the acknowledgement message G has the same format as acknowledgement message D described above in relation to FIG. 1. If the UE 160 does not receive any acknowledgement message G after completing the transmission of all of the pieces or receives an acknowledgement message G that does not acknowledge receipt of all of the pieces sent (e.g. with bits in the bitfield parameter set to 0), the UE 160 continues to send the missing or unacknowledged pieces based on, for example, the acknowledgement message received G, until all of the unacknowledged pieces have been re-sent at which point the UE 160 sends another completion message F (not shown) to indicate that all of the (unacknowledged) pieces have been (re-)sent.

The example of FIG. 2 shows the coordinating node 120 sending (or forwarding) an acknowledgement message G to acknowledge receipt at the IP node 320 but other possibilities exist. For example, the acknowledgement message G could also acknowledge receipt at the coordinating node 120 itself or at a non-coordinating node 130, 140, 150 in the CoMP set (after such node has properly acknowledged receipt back to the coordinating node 120). In other embodiments, any of the cooperating nodes 120, 130, 140, 150 may send an acknowledgement message G to the UE 160 to acknowledge receipt of pieces either at that node 120, 130, 140, 150 or at the IP node 320.

In some implementations, it may be desirable for each node 120, 130, 140, 150 to have all of the pieces received in the CoMP set by at least one other node 120, 130, 140, 150. In that scenario, each node 120, 130, 140, 150 sends its received piece(s) to other node(s) 120, 130, 140, 150 in the CoMP set which did not receive the piece(s) successfully. Further, the nodes 120, 130, 140, 150 may exchange acknowledgement messages and each node 120, 130, 140, 150 determines which, if any, received pieces are to be sent to other nodes 120, 130, 140, 150 based in part of acknowledgement messages received from other nodes 120, 130, 140, 150.

According to principles of the present disclosure, the transmission of piece messages E to the destination IP node 320 is controlled by the coordinating node 120. Specifically, the coordinating node 120 is configured to send pieces it successfully received to the IP node 320 and to request other non-coordinating nodes 130, 140, 150 to send the missing pieces (e.g. those not successfully received at the coordinating node 120) directly to the IP node 320 via its P-GW interface connection 124, 126, 128. The coordinating node 120 determines which other node 130, 140, 150 has received the missing pieces successfully based on acknowledgement messages received from the other nodes 130, 140, 150 in the CoMP set. In the example of FIG. 2, upon receipt of one or more pieces from the UE 160, the non-coordinating nodes 130, 140, 150 are configured to send an acknowledgement message H to the coordinating node 120 to acknowledge receipt.

In some embodiments, the acknowledgement message H has a format similar to the acknowledgement message G (and/or acknowledgement message D or FIG. 1) and may be used to acknowledge receipt of multiple pieces. The acknowledgement message may include a plurality of indicators (e.g. bitfield parameter) representing the pieces, in sequence and whether they have been successfully received or not. In other embodiments, the acknowledgement message H is a physical layer acknowledgment message or a TCP acknowledgement message.

In the example shown in FIG. 2, the acknowledgement message H is a physical layer message which may either be a positive acknowledgement (ACK) message indicating a successful transmission (ie successfully received) or a negative acknowledgement (NACK) message indicating an unsuccessful transmission (ie. not successfully received). In embodiments where each piece is sized to correspond to one or more Transport Blocks (TBs), the acknowledgement message H may include a set of physical layer acknowledgements (e.g. ACK/NACKs), each indicating whether or not a particular TB has been successfully received. In embodiments where each TB is sized to correspond to one or more Codewords (CWs), the acknowledgement message H may include a set of physical layer acknowledgements (e.g. ACK/NACKs), each indicating whether or not a particular CW has been successfully received. Other implementations for the acknowledgement message H are possible.

In some implementations, in addition to, or instead of the acknowledgement message G indicating whether multiple transmitted pieces have been received successfully at the IP node 320, the coordinating node 120 and optionally the non-coordinating nodes 130, 140, 150 may, in some implementations, use an acknowledgement message H to acknowledge receipt of individual pieces back to the UE 160. In this scenario, the acknowledgement message H indicates receipt at one or more nodes 120, 130, 140, 150 in the CoMP set or receipt at the IP node 320 (once receipt has been properly acknowledged back at the node 120, 130, 140, 150). Further, the acknowledgement message H may be is a physical layer acknowledgment message or a TCP acknowledgement message. If the acknowledgement message H is a physical layer message, it may include a set of physical layer acknowledgement messages (e.g. TB, CW ACK/NACK), each indicating whether or not for example a particular TB, or CW has been successfully received. Other implementations are possible.

FIG. 3 shows an example of a method 500 for a UE (e.g. UE 60 of FIG. 1 or UE 160 of FIG. 2) to upload a data file to a destination or network node (e.g. CoMP coordinating node 20 of FIG. 1 or IP node 320 or FIG. 2), using a CoMP set of cooperating nodes. The method begins at step 510 with the UE sending an upload request message (e.g. message A) to the cooperating nodes in the CoMP set for uploading the data file to the network node. In some implementations, the upload request message contains an identifier identifying a destination node for the file upload (e.g. the serving node 20 of FIG. 1 or the IP node 320 of FIG. 2). However, it is understood that there may be many other ways for the UE to signal the file upload destination to the coordinating node (and optionally non-coordinating nodes) in the CoMP set. For example, the UE may include a destination identifier in a message at the same or different layer than that used for the upload request message. In another example, the network node identification is included in the MetaInfo file message C or piece message E. Other possibilities exist. Advantageously, with an identification of the destination for the data file upload, the coordinating node (and optionally non-coordinating nodes) can efficiently route or direct the routing of pieces received to the intended destination according to the principles of the present disclosure described herein. At step 520, based on an upload grant from at least one cooperating node in the CoMP set, the UE sends a plurality of piece messages (e.g. message E) to cooperating nodes in the CoMP for transmission to the network node, each piece message containing a particular piece of the data file.

FIG. 4 shows another example of a method 600 for a UE in a RAN (e.g. UEs 60, 160 of FIGS. 1 and 2) to upload a data file to a destination node using a CoMP set of cooperating nodes. Although in this example the destination node is a serving or coordinating node (e.g. serving node 20 of FIG. 1), the example method is not limited as such and the destination node could be another node within or external to the RAN or related CN infrastructure (e.g. IP node 320 of FIG. 2). Also, in some implementations, example aspects (e.g. format, meaning, transmission means, etc.) of the messages referred to below in connection with this example method can be found described above in relation to FIGS. 1 and 2.

The uploading method begins at step 610 with the UE sending an upload request message (e.g. message A) to the cooperating nodes in the CoMP set for uploading a data file to the serving node which, in some implementations, contains an identifier identifying a destination node for the file upload (in this case the serving node). As noted above, the destination identifier may be sent in a different message (e.g. the MetaInfo file message C or piece message E). At step 620, the UE receives an upload grant message (e.g. message B) from at least one cooperating node, which in the implementation shown in FIG. 4 is the serving node. The grant message (or some other response or handshake message granting the upload request) from at least one cooperating node is indicative of an upload or uplink grant in the CoMP set. Once a grant is received, the UE proceeds to send a MetaInfo or descriptor file (message C) to the serving node at step 630 (for transmission to the destination node if the serving node is not the destination node). The serving node may or may not acknowledge receipt back to the UE. At step 640, the UE begins to send (unacknowledged) pieces to cooperating nodes in the CoMP set for transmission to the destination node (e.g. the serving node) using for example piece message E. At step 650, the UE receives an acknowledgement message (e.g. message G) acknowledging receipt of one or more pieces at the destination (serving) node. Once the UE has completed the transmission of all pieces, it sends a completion message (e.g. message F) to the cooperating nodes in the CoMP set for transmission to the destination or serving node (if the serving node did not receive the message directly) to indicate that all of the pieces have been sent.

If a determination is made that all of the pieces have been received at the destination (serving) node, for example by receiving an acknowledgement message (message G) acknowledging safe receipt of all of the pieces, the process ends at step 680. If a determination that not all of the pieces have been received, for example based on the fact that the UE did not receive any acknowledgement message after completing the transmission of all of the pieces or received an acknowledgement message that does not acknowledge receipt of all of the pieces sent, the process repeats itself from step 640 and the UE continues to send the missing or unacknowledged pieces based on, for example, acknowledgement message(s) received at step 650 until all of the unacknowledged pieces have been re-sent at which point the UE sends another completion message (step 660) to indicate that all of the (unacknowledged) pieces have been (re-)sent.

According to principles of the present disclosure, the coordination node controls how the pieces received by the cooperating nodes in the CoMP set are conveyed to the destination node. In particular, when the serving node does not receive certain pieces correctly from the UE but receives an acknowledgement that the (missing) pieces were received successfully at another cooperating node, the serving node is configured to direct the other cooperating node to send the piece(s) received directly to the destination node. In one example, the coordinating node is configured to receive piece messages from the wireless device for transmission to the destination node where each piece message contains a particular piece of the data file. The coordinating node then receives an acknowledgement message indicating that at least one piece has been received at a non-coordinating node, and if the at least one piece has not been received at the coordinating node, the coordinating node instructs the non-coordinating node to forward the at least one piece to the destination node. By directing non-coordinating nodes in the CoMP set to send pieces directly to the destination node (e.g. via an interface that does not involve the coordinating node), the coordinating node functionality advantageously may help further reduce the file transfer latency, improve the overall throughput and/or reduce cooperating node-to-node connection usage or cost.

FIG. 5 shows another, more detailed example of a method 700 for a coordinating node in a CoMP set to receive or cause to be received at a destination node (in the event the coordinating node is not the destination node) a file upload from a UE. In this example, the coordinating node is a serving node (e.g. serving node 20, 120 of FIGS. 1, 2).

The example method of FIG. 5 relies on the exchanges of messages between the UE, the serving node and other cooperating nodes in the CoMP set. In some implementations, example aspects (e.g. format, meaning, transmission means, etc.) of the messages referred to below in connection with this example can be found described above in relation to FIGS. 1 and 2. The method begins at step 710 with the serving node receiving an upload request message from the UE (e.g. message A) for uploading a data file to a destination node such as a network node (which could be the serving node). In some implementations, the upload request message (or some other message as described above in relation to FIG. 4) contains an identifier identifying a destination node for the file upload (e.g. the serving node 20 of FIG. 1 or the IP node 320 of FIG. 2) so that the serving node (and optionally non-coordinating nodes) in the CoMP set can efficiently route or direct the routing of pieces received to the intended destination according to the principles of the present disclosure described herein. As noted above, the destination identifier may be received in a different message (e.g. the MetaInfo file message C or piece message E). At step 720, the serving node sends an upload grant message (e.g. message B). In one implementation, the grant message (or some other response or handshake message granting the upload request) from the serving node is indicative of an upload or uplink grant in the CoMP set.

After the upload grant message has been sent, the serving node receives a MetaInfo or descriptor file (message C) from the UE at step 730 which may be followed by a receipt acknowledgement back to the UE. If the serving node is not the network node, it forwards the MetaInfo file received to the network node and optionally to non-coordinating node(s) in the CoMP set. At step 740, the serving node begins to receive (unacknowledged) data file pieces from the UE, for example, in the form of piece messages E. At step 750, the serving node also receives acknowledgements from non-coordinating node(s) to acknowledge data file piece(s) that were received successful or unsuccessfully. From step 750 the process moves via path B to step 760 where the serving node determines whether the piece(s) acknowledged to have been received successfully by non-coordinating node(s) have also been received successfully by the serving node. If not, the serving node requests or instructs the non-coordinating node(s) to forward the acknowledged piece(s) directly to the network node. This could be done for example based on the destination identifier received from the UE.

In the scenario where the serving node is not the network node, if at step 760, the serving node determines that the piece(s) acknowledged to have been received successfully by non-coordinating node(s) have also been received successfully by the serving node, the serving node forwards at step 780 the successfully received piece(s) to the network node. In some implementations, the forwarding is based on the destination identifier received form the UE. From steps 770 or 780, the method proceeds to step 790 where the serving node receives one or more acknowledgements (message G) from the network node acknowledging which pieces were received correctly or incorrectly. It is understood that in the scenario where the serving node is the network node, steps 780 and 790 do not need to be performed. Whether or not the serving node is the network node, the method continues at step 800, where the serving node sends acknowledgement(s) to the UE (message G) acknowledging which pieces were received correctly or incorrectly at the serving node or at the network node (if the serving and network nodes are different). At step 810, the serving node receives a completion message (e.g. message F) from the UE (or from a non-coordinating node in the CoMP set if the serving did not receive it directly) indicating that all of the pieces have been sent by the UE. If the serving node is not the network node, it forwards the completion message to the network node.

At step 820, if a determination is made that all of the pieces have been received at the destination node, for example, based on pieces received at the serving node or based on an acknowledgement (message G) received from the network node (if different from serving node), the process ends at step 830. If a determination that not all of the pieces have been received, for example based on the fact that the serving node did not receive all of the pieces correctly or received an acknowledgement message from the network node that does not acknowledge receipt of all of the pieces sent, the process goes back via path A to step 740 where the serving node continues to receive missing or unacknowledged pieces until all of the unacknowledged pieces have been successfully received at the destination node. At that point, the serving node receives another completion message from the UE (step 810) to indicate that all of the (unacknowledged) pieces have been (re-) sent.

According to principles of the present disclosure, non-coordinating nodes are configured to send piece receipt acknowledgements to the coordinating node and forward pieces to the destination node as requested or instructed by the coordinating node. In one example, a non-coordinating node receives at least one piece message from the wireless device for transmission to the destination node where each of the at least one piece message containing a particular piece of the data file. The non-coordinating node sends an acknowledgement message to the coordinating node indicating at least one piece has been received and if instructed by the coordinating node, it forwards the at least one piece received to the destination node.

FIG. 6 shows a more detailed example of a method 800 for a non-coordinating node in a CoMP set (e.g. non-coordinating node 130, 140 or 150 of FIG. 2) for uploading a data file from a UE to a destination node which, in this example, is a network node. The example method of FIG. 6 relies on the exchanges of messages between the UE, the coordinating and non-coordinating nodes and the network node. In some implementations, example aspects (e.g. format, meaning, transmission means, etc.) of the messages referred to below in connection with this example can be found described above in relation to FIGS. 1 and 2.

The method begins with steps 910 and 920 which are directed to the processing of the upload request and associated grant. In this example, these steps are optional and may not need to be carried out by the non-coordinating node (for example if done by the coordinating node in the CoMP set). At step 910 the non-coordinating node receives an upload request message from the UE (e.g. message A) for uploading a data file to the network node. In some implementations, the upload request message (or some other message as described above in relation to FIG. 4) contains an identifier identifying a destination node for the file upload (e.g. the serving node 20 of FIG. 1 or the IP node 320 of FIG. 2) so that the non-coordinating node can efficiently route pieces received to the intended destination according to the principles of the present disclosure described herein. In another implementation, the destination node identifier is received directly from the coordinating node in a different message via an X2 interface. At step 920, the non-coordinating node sends an upload grant message (e.g. message B) to the UE. In one implementation, the grant message (or some other response or handshake message granting the upload request) is indicative of an upload or uplink grant in the CoMP set. At step 930, the non-coordinating node receives a MetaInfo or descriptor file (message C) from the UE and/or the coordinating node. In some implementations, the non-coordinating node may optionally forward the MetaInfo file received to the network node at step 940. At step 950, the non-coordinating node begins to receive (unacknowledged) data file pieces from the UE, for example, in the form of piece messages E. At step 960, the non-coordinating node sends an acknowledgement (message G) to the coordinating node in the CoMP set (and optionally also to the UE) to acknowledge data file piece(s) that were received successful or unsuccessfully. At step 970, if requested by the coordinating node and based on the network node identifier received either from the coordinating node or directly from the UE, the non-coordinating node sends/forwards the piece(s) received successfully directly to the network node (e.g. with piece message E). At step 980, the non-coordinating node receives a completion message (e.g. message F) from the UE indicating that all of the pieces have been sent. The non-coordinating node may optionally forward the completion message to the network node.

At step 990, if a determination is made (at the non-coordinating node, the coordinating node or elsewhere), that all of the pieces have been received at the network node, for example, based on an acknowledgement (message G) received from the network node, the process ends at step 1000. If a determination that not all of the pieces have been received, for example based on an acknowledgement (message G) received from the network node acknowledging that not all of the pieces were correctly received, the process goes back to step 950 where the non-coordinating node continues to receive missing or unacknowledged pieces until all of the unacknowledged pieces have been successfully received at the network node at which point the non-coordinating node receives another completion message from the UE (step 980) to indicate that all of the (unacknowledged) pieces have been (re-) sent.

Other Examples

FIGS. 7A-D are block diagrams of exemplary embodiments of respectively a network node 1100, a coordinating node 1200 and a non-coordinating node 1300 and a wireless device 1400 (such as those described in relation to FIGS. 1-6)) configured for the upload of a data file in accordance with the principles of the present disclosure.

As illustrated in FIG. 7A, network node 1100 includes a transceiver 1110, one or more processor(s) 1120, memory 1130 which includes a descriptor module 1140, a piece module 1150 and an acknowledgement module 1160. In one embodiment, the transceiver 1110 may be replaced by a transmitter and a receiver (not shown). The descriptor module 1140 is configured to perform descriptor functionality described above which, as noted above includes receiving a descriptor or MetaInfo file containing metadata descriptive of the data file pieces to be uploaded. The piece module 1150 is configured to receive pieces from a wireless device (e.g. wireless device 1400) via either a coordinating node for a CoMP set of cooperating nodes (e.g. coordinating node 1200) or via a non-coordinating node in the CoMP set (e.g. non-coordinating node 1300)

The descriptor module 1140, piece module 1150 and the acknowledgement module 1160 are implemented at least partially in the memory 1130 in the form of software or (computer-implemented) instructions executed by the processor(s) 1120 within the network node 1100 or distributed across two or more nodes (e.g., the network node 1100 and another node). In another example, the processor(s) 1120 includes one or more hardware components (e.g., Application Specific Integrated Circuits (ASICs)) that provide some or all of the descriptor, piece and acknowledgement functionality described above. In another embodiment, the processor(s) 1120 include one or more hardware components (e.g., Central Processing Units (CPUs)), and some or all of the descriptor, piece and acknowledgement functionality described above is implemented in software stored in, e.g., the memory 1130 and executed by the processor 1120. In yet another embodiment, the processor(s) 1120 and memory 1130 form processing means (not shown) configured to perform the descriptor, piece and acknowledgement functionality described above.

In FIG. 7B, coordinating node 1200 includes a transceiver 1210, one or more processor(s) 1220, memory 1230 which includes a descriptor module 1240, a piece module 1150 and an acknowledgement module 1160. In one embodiment, the transceiver 1210 may be replaced by a transmitter and a receiver (not shown). If the coordinating node 1200 is configured as a destination node for data file uploads, the descriptor module 1240 is configured to perform descriptor receiving functionality described above for a coordinating or serving node configured as a destination node which, as noted above includes receiving a descriptor or MetaInfo file containing metadata descriptive of the data file pieces to be uploaded and optionally forwarding the descriptor file to non-coordinating nodes in the CoMP set. The piece module 1250 is configured to receive pieces from a wireless device (e.g. wireless device 1400) either directly or indirectly via a non-coordinating node in the CoMP set (e.g. non-coordinating node 1300) and the acknowledgement module 1260 is configured to perform the acknowledgement functionality described above for a coordinating node configured as a destination node. If the coordinating node 1200 is not configured as the destination node, the descriptor module 1240 may additionally be configured to perform descriptor forwarding functionality described above which includes sending or forwarding the received descriptor file to the destination node (e.g. network node 1100). In that scenario, the piece module 1250 is additionally configured to perform the piece transmission control functionality for a coordinating node not configured as a destination node which, as noted above, includes forwarding pieces received successfully from the wireless device to the destination node and for unsuccessfully received or missing pieces received successfully at other (non-coordinating) nodes in the CoMP set, directing those node(s) based no piece acknowledgements to send the piece(s) received directly to the destination node. The acknowledgement module is configured to perform the acknowledgement functionality described above for a coordinating node not configured as a destination node.

The descriptor module 1240, piece module 1250 and the acknowledgement module 1260 are implemented at least partially in the memory 1230 in the form of software or (computer-implemented) instructions executed by the processor(s) 1220 within the coordinating node 1200 or distributed across two or more nodes (e.g., the coordinating node 1200 and another node). In another example, the processor(s) 1220 includes one or more hardware components (e.g., ASICs) that provide some or all of the descriptor, piece and acknowledgement functionality described above. In another embodiment, the processor(s) 1220 include one or more hardware components (e.g. CPUs), and some or all of the descriptor, piece and acknowledgement functionality described above is implemented in software stored in, e.g., the memory 1230 and executed by the processor 1220. In yet another embodiment, the processor(s) 1220 and memory 1230 form processing means (not shown) configured to perform the descriptor, piece and acknowledgement functionality described above.

As illustrated in FIG. 7C, non-coordinating node 1300 includes a transceiver 1310, one or more processor(s) 1320, memory 1330 which includes an optional grant module 1340, a descriptor module 1350, a piece module 1360 and an acknowledgement module 1370. In one embodiment, the transceiver 1310 may be replaced by a transmitter and a receiver (not shown). The grant module 1340 and descriptor module 1350 are configured to perform the grant and descriptor functionality described above for a non-coordinating node. The piece module 1360 is configured to perform the piece receiving and forwarding functionality described above for a non-coordinating node and similarly, the acknowledgement module 1370 is configured to perform the acknowledgement functionality described above for a non-coordinating node.

The grant module 1340, descriptor module 1350, piece module 1360 and acknowledgement module 1370 are implemented at least partially in the memory 1330 in the form of software or (computer-implemented) instructions executed by the processor(s) 1320 within the non-coordinating node 1300 or distributed across two or more nodes (e.g., the non-coordinating node 1300 and another node). In another example, the processor(s) 1320 includes one or more hardware components (e.g., ASICs) that provide some or all of the grant, descriptor, piece and acknowledgement functionality described above. In another embodiment, the processor(s) 1320 include one or more hardware components (e.g. CPUs), and some or all of the grant, descriptor, piece and acknowledgement functionality described above is implemented in software stored in, e.g., the memory 1330 and executed by the processor(s) 1320. In yet another embodiment, the processor(s) 1320 and memory 1330 form processing means (not shown) configured to perform the grant, descriptor, piece and acknowledgement functionality described above.

As shown in FIG. 7D, wireless device 1400 includes a transceiver 1410, one or more processor(s) 1420, memory 1430 which includes an upload request module 1440, a descriptor module 1450, a piece module 1460 and an acknowledgement module 1470. In one embodiment, the transceiver 1410 may be replaced by a transmitter and a receiver (not shown). The upload request module 1440 and descriptor module 1450 are configured to perform the upload request and descriptor functionality described above for a wireless device. The piece module 1460 is configured to perform the piece sending functionality described above for a wireless device and similarly, the acknowledgement module 1470 is configured to perform the completion and acknowledgement functionality described above for a wireless device.

The upload request module 1440, descriptor module 1450, piece module 1460 and acknowledgement module 1470 are implemented at least partially in the memory 1430 in the form of software or (computer-implemented) instructions executed by the processor(s) 1420 within the wireless device 1400. In another example, the processor(s) 1420 includes one or more hardware components (e.g., ASICs) that provide some or all of the upload request, descriptor, piece and acknowledgement functionality described above. In another embodiment, the processor(s) 1420 include one or more hardware components (e.g. CPUs), and some or all of the upload request, descriptor, piece and acknowledgement functionality described above is implemented in software stored in, e.g., the memory 1430 and executed by the processor(s) 1420. In yet another embodiment, the processor(s) 1420 and memory 1430 form processing means (not shown) configured to perform the upload grant, descriptor, piece and acknowledgement functionality described above.

Figure 8B:
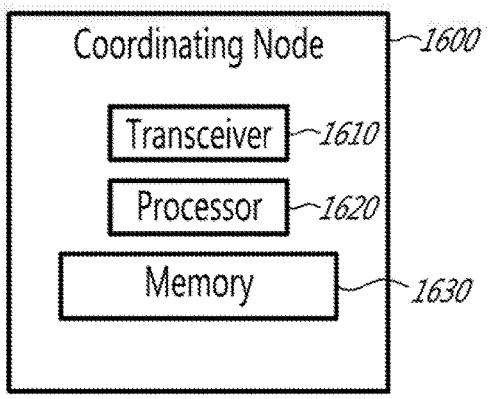
Figure 8C:
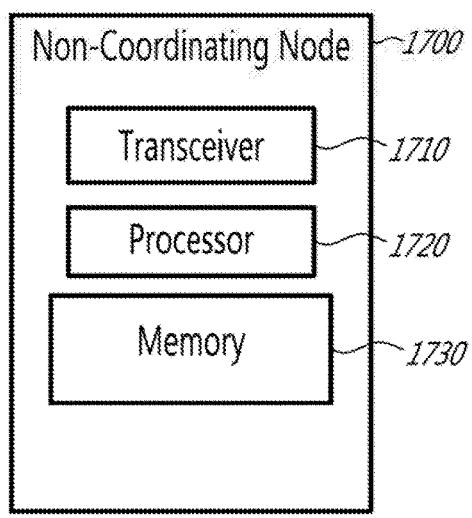
Figure 8D:
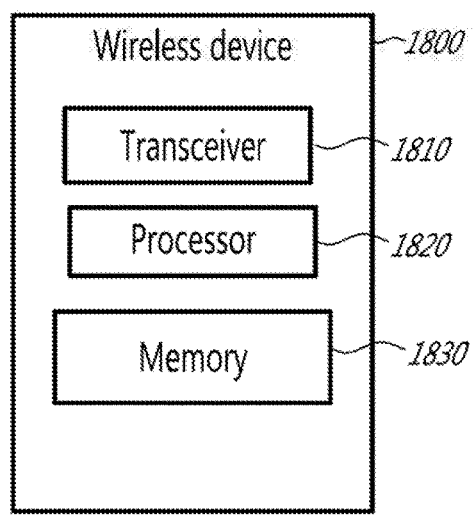

FIGS. 8A-D show a variant for each of the node and device examples of FIGS. 7A-D, denoted respectively as network node 1500, coordinating node 1600, non-coordinating node 1700 and wireless device 1800. Each of these nodes 1500, 1600, 1700 and device 1800 includes a transceiver 1510, 1610, 1710, 1810 and circuitry containing (computer-implemented) instructions which when executed by one or more processor(s) 1520, 1620, 1720, 1820 cause their respective node 1500, 1600, 1700 and device 1800 to perform some or all of their respective (network node, coordinating node, non-coordinating node and wireless device) functionality described above. In yet another variant, the circuitry includes the respective memory 1530, 1630, 1730, 1830 and processor(s) 1520, 1620, 1720, 1820 which, similarly to the example nodes 1100, 1200, 1300 and device 1400 of FIGS. 7A-D may be implemented in many different ways. In one example, the memories 1530, 1630, 1730, 1830, contain instructions which, when executed, cause the respective nodes 1500, 1600, 1700 and device 1800 to perform some or all of their respective (network node, coordinating node, non-coordinating node and wireless device) functionality described above. Other implementations are possible.

Other Contemplated Embodiments

The following is also noted in accordance with other contemplated embodiments:

According to a broad aspect of the disclosure, there is provided a method for a wireless device for uploading a data file as a plurality of pieces to a network node via a coordinated multipoint (CoMP) set of cooperating nodes in a wireless network where the CoMP set includes a coordinating node and at least one non-coordinating node. The method includes sending a upload request message to the cooperating nodes in the CoMP set for uploading the data file to the network node, and based on an upload grant from at least one cooperating node in the CoMP set, sending a plurality of piece messages to the cooperating nodes in the CoMP set for transmission to the network node, each piece message containing a particular piece of the data file.

In this aspect, in some embodiments, the upload request message includes an identifier of the network node. In some other embodiments, the method further includes based on the upload grant from the at least one cooperating node in the CoMP set, sending a descriptor message to the at least one cooperating node in the CoMP set for transmission to the network node. The descriptor message contains an index of the plurality of pieces of the data file. In some other embodiments, the network node is one of the coordinating node in the CoMP set, a core network node in a core network and an Internet Protocol (IP) network node in an IP network. In some other embodiments, the at least one cooperating node includes the coordinating node, and the method further comprises receiving from the coordinating node a grant message indicative of the upload grant.

In yet some other embodiments, the method further includes sending a completion message to the cooperating nodes in the CoMP set for transmission to the network node where the completion message indicates that the plurality of pieces has been sent. In yet some other embodiments, the upload request message and each of the plurality of piece messages are Transport Control Protocol (TCP) messages or alternatively, Multi-Path TCP (MPTCP) messages, each including a TCP subflow identifier.

In yet some other embodiments, the method further includes receiving from the coordinating node in the CoMP set an acknowledgement message indicating whether or not one or more of the plurality of pieces has been received. The acknowledgement message may include a plurality of indicators, each corresponding to one of the plurality of pieces, and each indicator is set based on whether or not the corresponding piece has been received at the network node. Alternatively, the acknowledgement message is one of a physical layer acknowledgement message and a TCP acknowledgement message.

In yet some other embodiments, each piece corresponds to one or more transport blocks and the acknowledgement message includes a set of physical layer acknowledgement messages, each indicating whether or not a particular transport block has been received at a cooperating node in the wireless network. In yet some other embodiments, each transport block corresponds to one or more code words and the acknowledgement message includes a set of physical layer acknowledgement messages, each indicating whether or not a particular code word has been received at a cooperating node in the wireless network. In yet some other embodiments, the physical layer acknowledgement message is one of a positive acknowledgement (ACK) message and a negative acknowledgement (NACK) message. In yet some other embodiments, the method further includes, based on the acknowledgement message received, re-sending one or more piece messages to the cooperating nodes in the CoMP set for transmission to the network node, the one or more piece messages containing the one or more of the plurality of pieces that has not been received.

According to another broad aspect of the disclosure, there is provided a wireless device for uploading a data file as a plurality of pieces to a network node via a coordinated multipoint (CoMP) set of cooperating nodes in a wireless network where the CoMP set includes a coordinating node and at least one non-coordinating node. In that aspect, the wireless device includes circuitry containing instructions which, when executed, cause the wireless device to send an upload request message to the cooperating nodes in the CoMP set for uploading the data file to the network node. Based on an upload grant from at least one cooperating node in the CoMP set, the instructions further cause the wireless device to send a plurality of piece messages to the cooperating nodes in the CoMP set for transmission to the network node where each piece message contains a particular piece of the data file.

In that aspect, in some embodiments, the upload request message includes an identifier of the network node. In some other embodiments, based on the upload grant from the at least one cooperating node in the CoMP set, the instructions further cause the wireless device to send a descriptor message to the at least one cooperating node in the CoMP set for transmission to the network node. The descriptor message contains an index of the plurality of pieces of the data file. In some other embodiments, the network node is one of the coordinating node in the CoMP set, a core network node in a core network and an Internet Protocol (IP) network node in an IP network. In yet some other embodiments, the at least one cooperating node includes the coordinating node, and the instructions further cause the wireless device to receive from the coordinating node a grant message indicative of the upload grant. In yet some other embodiments, the instructions further cause the wireless device to send a completion message to the cooperating nodes in the CoMP set for transmission to the network node. The completion message indicates that the plurality of pieces has been sent. In yet some other embodiments, the upload request message and each of the plurality of piece messages are Transport Control Protocol (TCP) messages or Multi-Path TCP (MPTCP) messages, each including a TCP subflow identifier.

In yet some other embodiments, the instructions further cause the wireless device to receive from the coordinating node in the CoMP set an acknowledgement message indicating whether or not one or more of the plurality of pieces has been received. In yet some embodiments, the acknowledgement message includes a plurality of indicators, each corresponding to one of the plurality of pieces, and each indicator is set based on whether or not the corresponding piece has been received at the network node. In yet some other embodiments, the acknowledgement message is one of a physical layer acknowledgement message and a TCP acknowledgement message. In yet some other embodiments, each piece corresponds to one or more transport blocks and the acknowledgement message includes a set of physical layer acknowledgement messages, each indicating whether or not a particular transport block has been received at a cooperating node in the wireless network. In some other embodiments, each transport block corresponds to one or more code words and the acknowledgement message includes a set of physical layer acknowledgement messages, each indicating whether or not a particular code word has been received at a cooperating node in the wireless network. In yet some other embodiments, the physical layer acknowledgement message is one of a positive acknowledgement (ACK) message and a negative acknowledgement (NACK) message. In yet some other embodiments, based on the acknowledgement message received, the instructions further cause the wireless device to re-send one or more piece messages to the cooperating nodes in the CoMP set for transmission to the network node where the one or more piece messages contain the one or more of the plurality of pieces that has not been received.

In yet another broad aspect of the present disclosure, there is provided a method for a coordinating node for uploading a data file from a wireless device to a network node via a coordinated multipoint (CoMP) set of cooperating nodes in a wireless network where the CoMP set includes the coordinating node and at least one non-coordinating node. In that aspect, the method includes receiving piece messages from the wireless device for transmission to the network node where each piece message contains a particular piece of the data file, receiving an acknowledgement message indicating at least one piece has been received at a non-coordinating node, and if the at least one piece has not been received at the coordinating node, instructing the non-coordinating node to forward the at least one piece to the network node.

In that aspect, in some embodiments, the method further includes if the at least one piece has been received at the coordinating node, forwarding the at least one piece to the network node. In some other embodiments, the method further includes receiving from the wireless device an upload request message for uploading the data file to the network node and in response, sending an upload grant to the wireless device. In yet some other embodiments, the upload request message contains an identifier of the network node. In yet some other embodiments, the method further includes receiving a descriptor message from the wireless device for transmission to the network node where the descriptor message contains an index of the plurality of pieces of the data file. In yet some other embodiments, the network node is one of the coordinating node in the CoMP set, a core network node in a core network and an Internet Protocol (IP) network node in an IP network. In yet some other embodiments, the method further includes sending to the wireless device an acknowledgement message indicating whether or not one or more of the plurality of pieces has been received. In yet some other embodiments, the acknowledgement message sent includes a plurality of indicators, each corresponding to one of the plurality of pieces, and each indicator is set based on whether or not the corresponding piece has been received at the network node.

In yet some other embodiments, the acknowledgement message sent is one of a physical layer acknowledgement message and a TCP acknowledgement message. In yet some other embodiments, each piece corresponds to one or more transport blocks and the acknowledgement message sent includes a set of physical layer acknowledgement messages, each indicating whether or not a particular transport block has been received at a cooperating node in the CoMP set. In yet some other embodiments, each transport block corresponds to one or more code words and the acknowledgement message sent includes a set of physical layer acknowledgement messages, each indicating whether or not a particular code word has been received at a cooperating node in the CoMP set. In yet some other embodiments, the physical layer acknowledgement message is one of a positive acknowledgement (ACK) message and a negative acknowledgement (NACK) message.

In yet another broad aspect of the present disclosure, there is provided a coordinating node for uploading a data file from a wireless device to a network node via a coordinated multipoint (CoMP) set of cooperating nodes in a wireless network where the CoMP set includes the coordinating node and at least one non-coordinating node. The coordinating node includes circuitry containing instructions which, when executed, cause the coordinating node to perform some or all of the coordinating node method embodiments described above.

In yet another broad aspect of the present disclosure, there is provided a method for a non-coordinating node for uploading a data file as a plurality of pieces from a wireless device to a network node via a coordinated multipoint (CoMP) set of cooperating nodes in a wireless network where the CoMP set includes a coordinating node and at least one non-coordinating node. In that aspect, the method includes receiving at least one piece message from the wireless device for transmission to the network node where each of the at least one piece message containing a particular piece of the data file, sending an acknowledgement message to the coordinating node indicating at least one piece has been received at the non-coordinating node and if instructed by the coordinating node, forwarding the at least one piece received to the network node.

In that aspect, in some embodiments, the method further includes forwarding the at least one piece to the network node only if instructed by the coordinating node. In some other embodiments, the method further includes receiving from the wireless device an upload request message for uploading the data file to the network node, and in response, sending an upload grant to the wireless device. In yet some other embodiments, the upload request message contains an identifier of the network node. In yet some other embodiments, the method further includes receiving a descriptor message from the wireless device for transmission to the network node where the descriptor message contains an index of the plurality of pieces of the data file. In yet some other embodiments, the network node is one of the coordinating node in the CoMP set, a core network node in a core network and an Internet Protocol (IP) network node in an IP network.

In yet some other embodiments, the acknowledgement message sent includes a plurality of indicators, each corresponding to one of the plurality of pieces, and each indicator is set based on whether or not the corresponding piece has been received at the network node. In yet some other embodiments, the acknowledgement message sent is one of a physical layer acknowledgement message and a TCP acknowledgement message. In yet some other embodiments, each piece corresponds to one or more transport blocks and the acknowledgement message sent comprises a set of physical layer acknowledgement messages, each indicating whether or not a particular transport block has been received at a the non-coordinating node. In yet some other embodiments, each transport block corresponds to one or more code words and wherein the acknowledgement message sent comprises a set of physical layer acknowledgement messages, each indicating whether or not a particular code word has been received at the non-coordinating node. In yet some other embodiments, the physical layer acknowledgement message is one of a positive acknowledgement (ACK) message and a negative acknowledgement (NACK) message.

In yet another broad aspect of the present disclosure, there is provided a non-coordinating node for uploading a data file from a wireless device to a network node via a coordinated multipoint (CoMP) set of cooperating nodes in a wireless network where the CoMP set includes at least a coordinating node and the non-coordinating node. The non-coordinating node includes circuitry containing instructions which, when executed, cause the coordinating node to perform some or all of the non-coordinating node method embodiments described above.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method for a wireless device for uploading a data file as a plurality of pieces to a network node via a coordinated multipoint (CoMP) set of cooperating nodes in a wireless network, wherein the CoMP set includes a coordinating node and at least one non-coordinating node, the method comprising:

sending an upload request message to the cooperating nodes in the CoMP set for uploading the data file as the plurality of pieces to the network node, wherein the upload request message comprises an identifier of the network node;

based on an upload grant from at least one cooperating node in the CoMP set, sending a plurality of piece messages to the cooperating nodes in the CoMP set for transmission to the network node, wherein each piece message of the plurality of piece messages comprises a particular piece of the data file; and receiving, from the coordinating node in the CoMP set, an acknowledgement message indicating whether or not one or more of the plurality of pieces of the data file have been received, wherein the acknowledgement message includes a plurality of indicators, wherein each indicator of the plurality of indicators corresponds to one of the plurality of pieces of the data file, and wherein each indicator of the plurality of indicators is set based on whether or not the corresponding piece of the plurality of pieces of the data file has been received at the network node.

2. The method of claim 1, further comprising based on the upload grant from the at least one cooperating node in the CoMP set, sending a descriptor message to the at least one cooperating node in the CoMP set for transmission to the network node, wherein the descriptor message comprises an index of the plurality of pieces of the data file.

3. The method of claim 1, wherein the network node is one of the coordinating node in the CoMP set, a core network node in a core network, and an Internet Protocol (IP) network node in an IP network.

4. The method of claim 1, wherein the at least one cooperating node comprises the coordinating node, and wherein the method further comprises receiving from the coordinating node, a grant message indicative of the upload grant.

5. The method of claim 1, further comprising sending a completion message to the cooperating nodes in the CoMP set for transmission to the network node, wherein the completion message indicates that the plurality of pieces of the data file has been sent.

6. The method of claim 1, wherein the upload request message and each piece message of the plurality of piece messages are Transport Control Protocol (TCP) messages.

7. The method of claim 1, wherein the upload request message and each piece message of the plurality of piece messages are Multi-Path Transport Control Protocol (MPTCP) messages, and wherein each MPTCP message of the MPTCP messages includes a TCP subflow identifier.

8. The method of claim 1, wherein the acknowledgement message is one of a physical layer acknowledgement message and a Transport Control Protocol (TCP) acknowledgement message.

9. The method of claim 8, wherein the physical layer acknowledgement message is one of a positive acknowledgement (ACK) message and a negative acknowledgement (NACK) message.

10. The method of claim 1, wherein each piece of the plurality of pieces of the data file corresponds to one or more transport blocks, wherein the acknowledgement message comprises a set of physical layer acknowledgement messages, and wherein each physical layer acknowledgement message of the set of physical layer acknowledgement messages indicates whether or not a particular transport block of the one or more transport blocks has been received at a cooperating node of the cooperating nodes in the wireless network.

11. The method of claim 10, wherein each transport block of the one or more transport blocks corresponds to one or more code words, and wherein each physical layer acknowledgement message of the set of physical layer acknowledgement messages indicates whether or not a particular code word of the one or more code words has been received at the cooperating node of the cooperating nodes in the wireless network.

12. The method of claim 1, further comprising based on the acknowledgement message received, re-sending one or more piece messages of the plurality of piece messages to the cooperating nodes in the CoMP set for transmission to the network node, wherein the one or more piece messages of the plurality of piece messages comprises the one or more of the plurality of pieces of the data file that have not been received.

13. A wireless device for uploading a data file as a plurality of pieces to a network node via a coordinated multipoint (CoMP) set of cooperating nodes in a wireless network, wherein the CoMP set includes a coordinating node and at least one non-coordinating node, wherein the wireless device comprises circuitry, and wherein the circuitry comprises instructions which, when executed, cause the wireless device to:
  send an upload request message to the cooperating nodes in the CoMP set for uploading the data file as the plurality of pieces to the network node, wherein the upload request message comprises an identifier of the network node;
  based on an upload grant from at least one cooperating node in the CoMP set, send a plurality of piece messages to the cooperating nodes in the CoMP set for transmission to the network node, wherein each piece message of the plurality of piece messages comprises a particular piece of the data file; and
  receive, from the coordinating node in the CoMP set, an acknowledgement message indicating whether or not one or more of the plurality of pieces of the data file have been received, wherein the acknowledgement message includes a plurality of indicators, wherein each indicator of the plurality of indicators corresponds to one of the plurality of pieces of the data file, and wherein each indicator of the plurality of indicators is set based on whether or not the corresponding piece of the plurality of pieces of the data file has been received at the network node.

14. The wireless device of claim 13, wherein based on the upload grant from the at least one cooperating node in the CoMP set, the instructions further cause the wireless device to send a descriptor message to the at least one cooperating node in the CoMP set for transmission to the network node, and wherein the descriptor message comprises an index of the plurality of pieces of the data file.

15. The wireless device of claim 13, wherein the network node is one of the coordinating node in the CoMP set, a core network node in a core network, and an Internet Protocol (IP) network node in an IP network.

16. The wireless device of claim 13, wherein the at least one cooperating node comprises the coordinating node, and wherein the instructions further cause the wireless device to receive, from the coordinating node, a grant message indicative of the upload grant.

17. The wireless device of claim 13, wherein the instructions further cause the wireless device to send a completion message to the cooperating nodes in the CoMP set for transmission to the network node, and wherein the completion message indicates that the plurality of pieces of the data file has been sent.

18. The wireless device of claim 13, wherein the upload request message and each piece message of the plurality of piece messages are Transport Control Protocol (TCP) messages.

19. The wireless device of claim 13, wherein the upload request message and each piece message of the plurality of piece messages are Multi-Path Transport Control Protocol (MPTCP) messages, and wherein each MPTCP message of the MPTCP messages includes a TCP subflow identifier.

20. The wireless device of claim 13, wherein the acknowledgement message is one of a physical layer acknowledgement message and a Transport Control Protocol (TCP) acknowledgement message.

21. The wireless device of claim 20, wherein the physical layer acknowledgement message is one of a positive acknowledgement (ACK) message and a negative acknowledgement (NACK) message.

22. The wireless device of claim 13, wherein each piece of the plurality of pieces of the data file corresponds to one or more transport blocks, wherein the acknowledgement message comprises a set of physical layer acknowledgement messages, and wherein each physical layer acknowledgement message of the set of physical layer acknowledgement message indicates whether or not a particular transport block of the one or more transport blocks has been received at a cooperating node of the cooperating nodes in the wireless network.

23. The wireless device of claim 22, wherein each transport block of the one or more transport blocks corresponds to one or more code words and wherein each physical layer acknowledgement message of the set of physical layer acknowledgement messages indicates whether or not a particular code word of the one or more code words has been received at the cooperating node of the cooperating nodes in the wireless network.

24. The wireless device of claim 13, wherein based on the acknowledgement message received, the instructions further cause the wireless device to re-send one or more piece messages of the plurality of piece messages to the cooperating nodes in the CoMP set for transmission to the network node, and wherein the one or more piece messages of the plurality of piece messages comprises the one or more of the plurality of pieces of the data file that have not been received.

25. A coordinating node for uploading a data file from a wireless device to a network node via a coordinated multipoint (CoMP) set of cooperating nodes in a wireless network, wherein the CoMP set includes the coordinating node and at least one non-coordinating node, wherein the coordinating node comprises circuitry, and wherein the circuitry comprises instructions which, when executed, cause the coordinating node to:

receive piece messages from the wireless device for transmission to the network node, wherein the piece messages comprise a plurality of pieces of the data file;

send, to the wireless device, a first acknowledgement message indicating whether or not one or more of the plurality of pieces of the data file have been received, wherein the first acknowledgement message includes a plurality of indicators, wherein each indicator of the plurality of indicators corresponds to one of the plurality of pieces of the data file, and wherein each indicator of the plurality of indicators is set based on whether or not the corresponding piece of the plurality of pieces of the data file has been received at the network node;

receive a second acknowledgement message indicating that at least one piece, from the plurality of pieces of the data file, comprised in the piece messages has been received at a non-coordinating node of the at least one non-coordinating node; and if the at least one piece comprised in the piece messages has not been received at the coordinating node, instruct the non-coordinating node of the at least one non-coordinating node to forward the at least one piece comprised in the piece messages to the network node.

* * * * *